US008635052B1

(12) United States Patent
Mallet et al.

(10) Patent No.: US 8,635,052 B1
(45) Date of Patent: Jan. 21, 2014

(54) METHOD AND APPARTUS FOR TRANSFORMING A STRATIGRAPHIC GRID

(75) Inventors: Jean-Laurent Mallet, Garnich (LU); Wan-Chiu Li, Nancy (FR); Jean-Claude Dulac, Sugar Land, TX (US)

(73) Assignee: Paradigm Ltd., George Town, Grand Cayman (KY)

( * ) Notice: Subject to any disclaimer, the term of this patent is extended or adjusted under 35 U.S.C. 154(b) by 632 days.

(21) Appl. No.: 12/795,494

(22) Filed: Jun. 7, 2010

(51) Int. Cl.
*G06G 7/48* (2006.01)
(52) U.S. Cl.
USPC ........................................................ 703/10
(58) Field of Classification Search
USPC ........................................................ 703/10
See application file for complete search history.

(56) References Cited

U.S. PATENT DOCUMENTS

2008/0021684 A1   1/2008  Dulac
2008/0243454 A1*  10/2008 Mallet .............................. 703/6

OTHER PUBLICATIONS

Mallet: Numerical Earth Models; Eagle Publications 148 pp.; 2008.*
Frank; Advanced Visualization and Modeling of Tetrahedral Meshes; Doctorat de l'Institut National Polytechnique de Lorraine; 140 pp.; 2006.*
GOCAD Suite 2.5 User Guide; Part IV Foundation Modeling and Editing; Paradigm product user guide; 2008; 416 pp.*
Mallet; Geomodeling; chapter 6; 2002; 37 pp.; Oxford University Press.*
New SGrid Cut Algorithm and Structures: Deny, Jean-Laurent Mallet. (1997) in: Proc. 15th Gocad Meeting, Nancy, France, 5 pages.
The SGrid Cut Revisited: Deny, DeBaun Levy, Cognot. ( 1997) in Proc. 16thG0cad Meeting, Dallas; 8 pages.
Fiber Based SGrid Construction: Cognot Jean-Laurent Mallet, Souche, Massot. (2001) in Proceedings of the Jun. 2001 Gocad Meeting, 9 pages.
Numerical Earth Models by Jean-Laurent Mallet (Eagle Publications, 2008, 148 pages) [Part 1 of 3—pp. 1-54].
Numerical Earth Models by Jean-Laurent Mallet (Eagle Publications, 2008, 148 pages). [Part 2 of 3—pp. 55-110].
Numerical Earth Models by Jean-Laurent Mallet (Eagle Publications, 2008, 148 pages) [Part 2 of 3—pp. 111-148].
KINE3D: a New 3D Restoration Method Based on a Mixed Approach Linking Geometry and Geomechanics; by I. Moretti, F. Lepage and M. Guiton ; Oil & Gas Science and Technology—Rev. IFP, vol. 61 (2006), No. 2, pp. 277-289.
Balanced restoration of geological vols. with relaxed meshing constraints by Pauline Durand-Riard ; Journal Computers & Geosciences archive vol. 36 Issue 4, Apr. 2010 pp. 441-452.
Dynel3D/IGeoss brochure downloaded May 3, 2013, 2 pages.

* cited by examiner

*Primary Examiner* — Hugh Jones
(74) *Attorney, Agent, or Firm* — Marc Van Dyke; 4th Dimension IP

(57) ABSTRACT

A method of transforming an input stratigraphic grid SGrid which represents a region including one or more geological discontinuities is now disclosed. At least one target cell that is local to one or more geological discontinuities is transformed by displacing at least one target vertex of the target cell of the input SGrid in a selected direction that: i) is selected to approximate a local tangent of the reference horizon; and ii) is oriented from the target vertex to a representative manifold representing one of the geological discontinuities and/or an intersection between two or more of the geological discontinuities. A magnitude of a displacement by which the target vertex is moved is determined according to a non-Euclidian distance between the target vertex of the target cell of the input SGrid and the representative manifold.

23 Claims, 42 Drawing Sheets

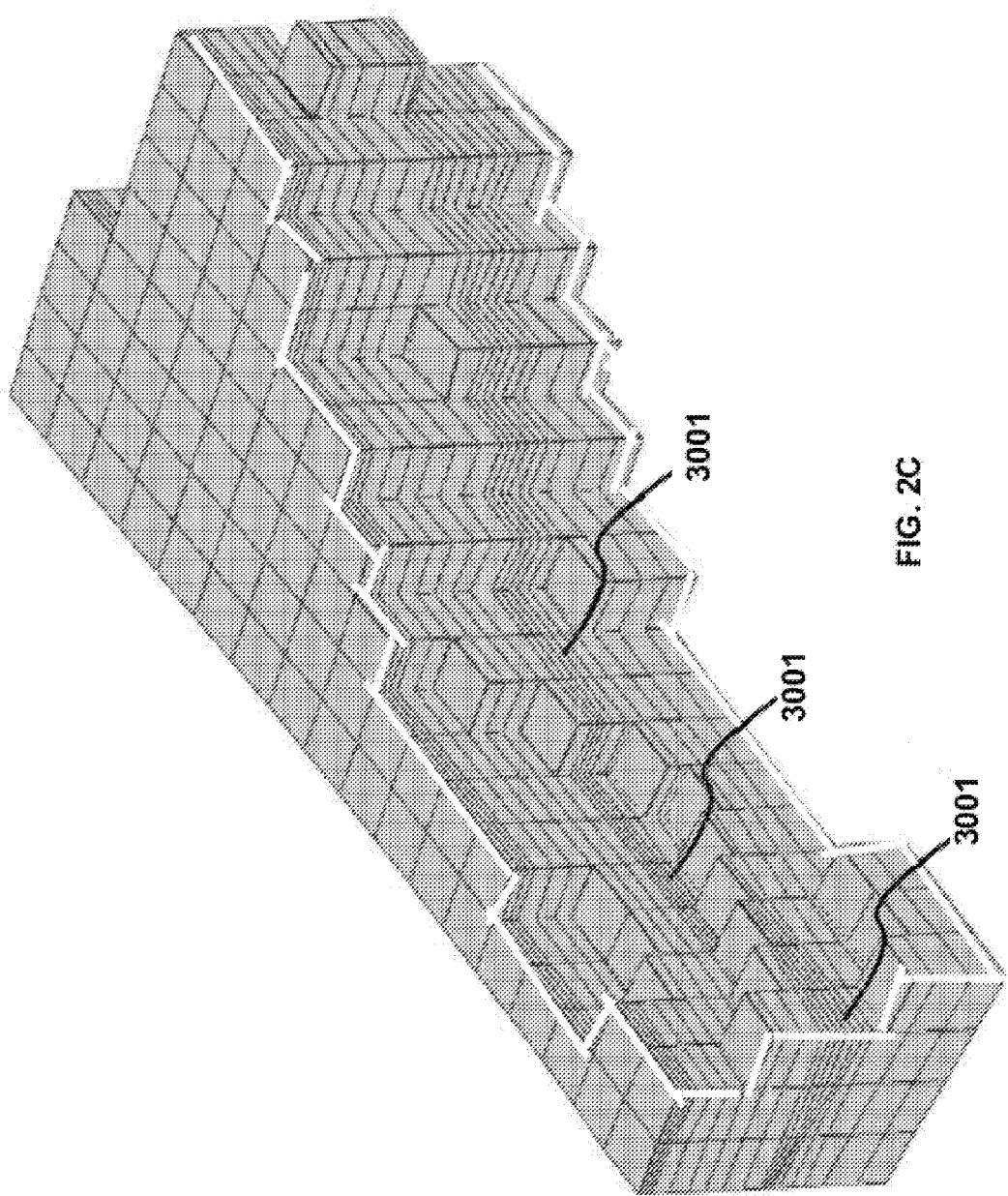

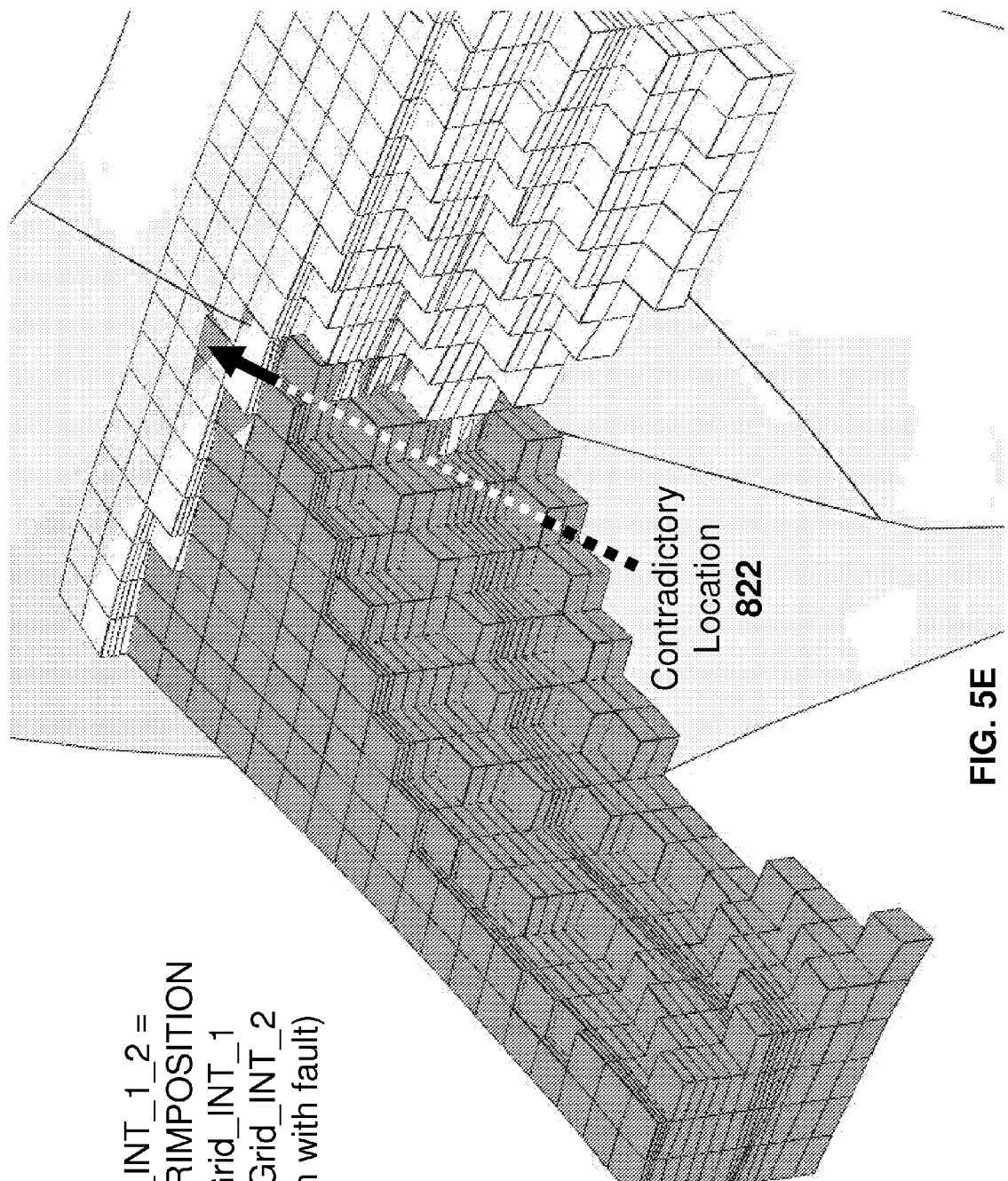

METHOD AND APPARTUS FOR TRANSFORMING A STRATIGRAPHIC GRID

FIELD OF THE INVENTION

The present invention relates to computerized tools for creating digital models of the Earth's subsurface.

BACKGROUND OF THE INVENTION

There is an ongoing need for improved computerized tools which facilitate the locating of new oil and natural gas reservoirs, the optimizing of production from new and existing reservoirs, and for other related geological applications. Some embodiments of the present invention relate to stratigraphic grids (SGrids) that provide a stair-stepped approximation of a geological discontinuity. One technique for producing such an SGrid is disclosed in US 2008/0243454, of one of the present inventors.

As was discussed in the background section of US 2008/0243454, incorporated herein by reference in its entirety, many conventional tools for generating a stratigraphic grid suffer a number of drawbacks. For example, these tools may incorrectly model "dying faults," they may produce an inaccurate geological model in the presence of faults intersecting each other in an "Y" or "X" manner, or they may produce degenerated and/or distorted cells. When simulating flow via through a geological terrain represented by one of these conventional stratigraphic grids, these degenerated and/or distorted cells may yield less-than-optimal results.

US 2008/0243454 describes an improved 'dual cookie cutter' partitioning technique for building a stratigraphic grid (SGrid). In some embodiments, the 'dual cookie cutter' technique disclosed in US 2008/0243454 may produces a grid model that approximate fault surfaces in a stair stepped way, regardless of the complexity of the horizons and/or faults. In one non-limiting example, the cells generated by the dual cookie cutter partitioning technique are hexahedral cells having angles that approximate right angles—nevertheless, as was noted in US 2008/0243454, this is not a limitation.

FIG. 1 illustrates (i) a fault network of faults 1001, 1002 and 1003 and (ii) an SGrid 1004 which models the Earth's subsurface in the presence of the faults. The SGrid provides a stair-step approximation of these faults both in the horizontal and vertical direction.

FIG. 2A more clearly illustrates the "stair-step" approximation of faults 1001-1004. SGrid of FIG. 2A includes four sub-regions which are determined according to faults 1001-1004: (i) a first sub-region (labelled "Sub-region I" 110 or the black region) (ii) a second sub-region (labelled "Sub-region II" 120 or the dark grey region); (iii) a third sub-region (labelled "Sub-region III" 130 of the light grey region) and (iv) a fourth sub-region (labelled "Sub-region IV" 140 or the white region).

As is evident by comparing FIG. 1 to FIG. 2A, the boundary between the first 110 and second subregions 120 in FIG. 2A approximates fault 1001 in certain locations. Because the cells of FIG. 2A are substantially hexahedral cells, the intersection of fault 1001 with the 'top' reference horizon (see paragraph [0004] of US 2008/243454 for a definition of reference horizons) is approximated by a series of straight lines that are either parallel to each other or at right angles to each other—hence the 'stair-step' approximation of the geological discontinuity.

FIG. 2B is an exploded view of the SGrid of FIG. 2A.

The broken white line of FIG. 2C illustrates the "stair-step" approximation of fault 1001 provided by the 'border' surface between sub-region I 110 and sub-region II 120 (i.e on the 'side' of the border of sub-region I 110). The facets enclosed by the broken white line collectively approximate a fault (or a line formed by the intersection of multiple faults). One salient feature of these facets is that they are substantially rectangular shaped, though as discussed below (and within US 2008/243454), this should not be construed as a limitation for the dual-cookie cutter method.

The broken line of FIG. 3A illustrates a horizontal stair-step border between cells of the dark grey region and cells of the light grey region. FIG. 3B illustrates the relationship between the 'stair-stepped' border and a curve that is an intersection between fault 1002 and the reference horizon. As is illustrated in FIG. 3C, cells (marked with an "X") of sub-region III 130 may be internally divided by the fault. This is one feature that is provided by 'dual-cookie cutter' technique (see FIG. 13 of US 2008/0243454 and compare to FIG. 12 of US 2008/0243454) according to some embodiments.

In FIG. 3D, the cells of region II 120 that border the 'internally-divided' cells of sub-region III 130 are marked with the letter Y. The actual fault 1002 is illustrated in FIGS. 3C-3D, and it is clear from the figure that the 'stair-step' outline (i.e. shown in the bold broken line—this outline delineated the 'border' between cells of sub-region II 120 and cells of sub-region III 130) approximates fault 1002 B (or as illustrated in FIGS. 3C-3D, the intersection between fault 1002 and reference horizon).

In FIGS. 3E-3F, certain cells that are proximate to multiple geological discontinuities (i.e. both faults 1002 and 1003) are illustrated including cells marked with a "Z", a "T" a "V" and a "U."

It is noted that the dual-cookie cutter technique may yield 'horizontal stair-steps' as illustrated in FIG. 3, as well as "vertical stair-steps' illustrated in FIG. 4 where the 'substantially vertical surface' of FIG. 4B is typically a surface that is substantially perpendicular to a 'reference horizon'

In FIG. 4B, some of the cells that are internally divided by a fault are marked with a "+."

FIG. 4C shows a part of the SGrid represented in the earlier figures where the cells internally intersected by the fault 1001 are represented in dark grey.

In some implementations of the dual cookie cutter algorithm, it is possible to generate two 'competing intermediate grids' which may contradict each other in one or more cells. Each 'intermediate grid' may represent a specific sub-region and have 'stair-step properties.' However, in 'intersection regions' near the geological discontinuity where the intermediate grids 'contradict each other,' it is possible to 'resolve' the contradicting By 'contradict each other,' we mean that there is at least one location in 3D space where according to the first 'intermediate grid' which models sub-region 'i' (i is a positive integer) the location in space 'belongs to' sub-region i, while according to the 'second intermediate grid the location in space 'belongs' not to sub-region j. When these two intermediate grids are superimposed upon each other, overlapping cells may be generated.

FIG. 5A is a flow chart of a routine for generating a non-contradicting SGrid with a stair-step representation of a geological discontinuity. In step S311, a first stair-stepped intermediate grid SGrid_INT_1 is generated—see, for example, the grid of FIG. 5B. In step S315, a second stair-stepped intermediate grid SGrid_INT_2 is generated—see, for example, the grid of FIG. 5C. FIG. 5D-5E illustrate a single SGrid that is SGRID_INT_1 superimposed upon SGRID_INT_2—it is possible to see overlapping cells at the location of the geological discontinuity.

In step S319, the two intermediate grid (which have overlapping cells) are resolved to provide a single stair-stepped approximation of the geological discontinuity (see FIG. 5F). In some examples, FIG. 5F is the 'final product' of the dual cookie cutter. The SGrid of FIG. 5F is sub-portion of the grids of FIGS. 1-3.

In some examples, this of step S319 resolving may require merging cells and/or eliminating vertices and/or eliminating cells in order for the 'contradictory location' to only be a part of a single sub-region.

One common feature of both the intermediate grids of FIGS. 5B-5D and of the 'resolved grid' of FIG. 5F is that both grids may include cells that are internally divided by a geological discontinuity (e.g. a fault).

FIGS. 6A-6B relate to the example of FIG. 3 where individual cells in sub-region II 120 are labelled as 240, while individual cells in sub-region III 130 are labelled as 260.

Embodiments of the present invention relate to methods and apparatus for transforming SGrids that include "vertical" stair-step representations of geological discontinuities in a direction perpendicular to the reference horizons.

Although the SGrid 1004 of FIG. 1-5 was generated using the dual-cookie cutter stratigraphic grid partitioning technique of US 2008/0243454, it is appreciated that other techniques may be utilize to generate 'stair-step' approximations of geological discontinuities.

As noted above, although many examples of dual cookie cutter partitioning technique relate hexahedral cells having angles that approximate right angles and faces nevertheless, as was noted in US 2008/0243454, this is not a limitation. Thus, the dual cookie cutter technique may be employed to generate cells whose top and bottom facets (i.e. which are each substantially coplanar with a local plane tangent to an horizon) have a polygonal shape rather than quadrangular shape.

In one example, the top and bottom facets (i.e. which are each substantially coplanar with a local plane of a 'reference horizon') have a triangular shape, and the cells generated using the dual cookie cutter technique have the shape of a triangular prism. In another example, the top and bottom faces have a hexagon shape, and the cells. In both of these cases, the lateral cells are quadrilateral (for example, substantially rectangular) and approximately orthogonal to the local plane of a reference horizon. In both of these cases, it is possible that the approximation of the geological discontinuity (e.g. fault) within the local plane of a reference horizon may be 'zig-zag' rather than 'stair-stepped,' the approximation of the geological discontinuity in the direction normal to the local plane of a reference horizon (i.e. in substantially the 'vertical' direction) remains a 'stair-stepped' approximation. This is because even these cells have a quadrilateral (e.g. substantially rectangular) shape in the direction normal to the local plane of a reference horizon.

In the examples discussed above, the dual cookie cutter was used to generate a stair-stepped approximation of a fault that divides between two different sub-regions. This is not another limitation. In yet another example, cells may be divided according to intersection locations between a "dying fault" and a dual fiber of a column. In this case, the 'dying fault' may also be represented by a 'stair-step' representation—however, in this case, the stair-step representation of the dying fault would not be a 'border' between different sub-regions but rather would reside 'internally' within a single sub-region.

DEFINITIONS

For the sake of clarity, the following preliminary definitions are given. Other definitions may be used.

Euclidian Distance—In mathematics, the Euclidean distance or Euclidean metric is the "ordinary" distance between two points $p=(x_1,y_1,z_1)$ and $q=(x_2,y_2,z_2)$ in three dimensions $d(p,q)=\sqrt{(x_2-x_1)+(y_2-y_1)^2+(z_2-z_1)^2}$ that one would measure with a ruler, and is given by the Pythagorean formula. By using this formula as distance, Euclidean space (or even any inner product space) becomes a metric space. The associated norm is called the Euclidean norm. Older literature refers to the metric as Pythagorean metric.

A 'non-Euclidian' distance between two points $p=(x_1,y_1,z_1)$ and $q=(x_2,y_2,z_2)$ in three dimensions is a distance according to a metric other than a Euclidian metric. One) example is $d_{NON\_EUCLIDIAN1}(p,q)=\sqrt{(x_2-x_1)^2+(y_2-y_1)^2}$. Another example is $d_{NON\_EUCLIDIAN2}(p,q)=\sqrt{\frac{1}{4}(x_2-x_1)^2+\frac{1}{3}(y_2-y_1)^2+\frac{5}{12}(z_2-z_1)^2}$ Once a non-Euclidian metric is defined, it is possible to determine, according to this metric, the 'distance' (i.e. according to the non-Euclidian metric) between two points, and/or to determine the point on a line (or in a plane or on any other manifold) that is 'closest' to a given point (i.e. according to the non-Euclidian metric), or any other geometric parameter that depends on the non-Euclidian metric Horizons, Faults and Unconformities—In stratified layers, horizons, unconformities, and faults may be curvilinear surfaces which may be for example characterized as follows. A horizon H(t) may be a surface corresponding to a plurality of particles of sediment deposited, approximately, at substantially the same geological time or range of time (t). A fault may be a surface of discontinuity of the terrains that may have been induced by a relative displacement of terrains on both sides of such surfaces. Typically, faults may cut horizons and also cut other faults. An unconformity may be a surface of discontinuity along a horizon that may have been induced by an erosion of old terrains replaced by new ones. When discussed herein, unconformities are treated as faults: as a consequence, in the following faults must be understood as either real faults or unconformities.

Reference Horizons—The studied geological domain may be characterized by a series of surfaces referred to as "reference horizons" $\{H(t(1)), H(t(2)), \ldots, H(t(N))\}$, which may separate layers of modeled data having significantly distinct physical properties and may be associated with pseudo geological times of deposition $\{t(1), t(2), \ldots, t(N)\}$, respectively. "Pseudo geologic time" may refer to a parameter which may be an arbitrary monotonic increasing function of real (e.g., generally unknown) geological time. When discussed herein and for the sake of clarity, the horizons are implicitly assumed to be sorted according to their pseudo geological time so that $H(t(1))$ is assumed to correspond to the older sediments and $H(t(N))$ to the younger. In other words, the deposition time $t(i)$ of $H(t(i))$ is lower than the deposition time $t(i+1)$ of $H(t(i+1))$.

Stratigraphic Grid—A stratigraphic grid (e.g., also referred to as a "SGrid") may include a plurality of stratigraphic cells. A stratigraphic grid may be arranged in a substantially regular pattern such that for example all the cells constitute a partition of the studied geological domain without any gap or overlapping and such that, from a topological point of view, cells may share only substantially common vertices, substantially common edges, and substantially common faces.

Reference is made to FIG. 2 of US 2008/0243454 and to FIG. 3 of US 2008/0243454, which are schematic illustrations of structured and unstructured stratigraphic grids, respectively. A structured stratigraphic grid may be a stratigraphic grid 200 where substantially all of cells 210 have substantially the same topological structure, for example, when all of cells 210 have a substantially hexahedral shape Otherwise, a stratigraphic grid 300 may unstructured and may have irregular cells 310, such as polyhedral cells that are not hexahedral.

SUMMARY OF EMBODIMENTS

A method of transforming an input stratigraphic grid SGrid which represents a region including one or more geological discontinuities is now disclosed. The method comprises: for at least one target cell that is local to one or more geological discontinuities, the target cell being selected from the group consisting of: i) a divided cell that is divided by one or more of the geological-discontinuities; and ii) a bordering cell that borders one or more the geological-discontinuities and/or one or more of the divided cells, transforming the target cell by displacing at least one target vertex of the target cell of the input SGrid in a selected direction that: i) is selected to approximate a local tangent of the reference horizon; and ii) is oriented from the target vertex to a representative manifold representing one of the geological discontinuities and/or an intersection between two or more of the geological discontinuities, wherein a magnitude of a displacement by which the target vertex is moved is determined according to a non-Euclidian distance between the target vertex of the target cell of the input SGrid and the representative manifold.

By moving the one or more vertices of the input stratigraphic grid SGrid, it is possible to obtain 'transformed SGrid' that represents the region of the Earth's subsurface.

In some embodiments, the method further comprises: classifying cells of the input stratigraphic grid to identify which cells are geological-discontinuity-local cells that are local to the one or more geological discontinuities, wherein the transforming of the input stratigraphic grid vertex is carried out selectively or preferentially to target cells that are identified as geological-discontinuity-local cells.

In some embodiments, the target cells are cells that are local to one of: i) an inter-region geological discontinuity describing a border between multiple sub-regions of the Earth's sub-surface; and ii) a dying fault that resides within a single sub-region of the Earth's sub-surface.

In some embodiments, the method further comprises the step of: classifying vertices of the geological-discontinuity-local cells to determine which vertices are border vertices of a border between multiple sub-regions of the Earth's sub-surface that approximates one or more of the geological discontinuities, wherein the transforming of the input stratigraphic grid vertex is carried out selectively or preferentially to target vertices that are identified as border vertices.

In some embodiments, the transforming of the input stratigraphic grid vertex is carried out selectively or preferentially to target vertices that are identified as stair-stepped-border vertices. that are part of a stair-stepped approximation of one or more of the geological discontinuities.

In some embodiments, the cell transforming is selectively carried out respectively for each cell of a stair-step set of cells which collectively provide a stair-step approximation of a geological continuity, thereby smoothing a stair-step approximation of the geological discontinuity.

In some embodiments: i) the method further comprises the step of determining a number of local geological discontinuities that are local to the target vertex or target vertex; ii) the representative manifold is indicative of the determined number of local geological discontinuities; and iii) the magnitude of the displacement by which the target vertex is moved and the selected direction are determined according to the number of local geological discontinuities.

In some embodiments, the cell transforming is carried out so to preserve the number of sides and the number of vertices of the geological-discontinuity-facing facet.

In some embodiments, the cell transforming is carried out so that, from a topological perspective, lateral facets of i) input cells of the input SGrid and; ii) cells of the transformed grid both have a topologically quadrilateral shape. (i.e., with four vertices).

In some embodiments, the cell transforming is carried out to a transform a target cell that is intersected by a geological discontinuity into a transformed cell that is not intersected by a geological discontinuity.

In some embodiments, the input SGrid is a contradictory SGrid comprising overlapping cells and the method is carried out to resolve the self-contradiction and transform overlapping cells so that they no longer overlap.

In some embodiments, the transforming effects at least one of: i) increasing or decreasing a size of the target cell by at least 50%; and ii) increasing or decreasing an area of a facet of the target cell by at least 50%.

In some embodiments, the transforming of the target cell modifies an angle within the target cell from substantially a right angle within a tolerance of 15 degrees to substantially a sharp angle that deviates from a right angle by at least 45 degrees.

In some embodiments, the non-Euclidian distance metric is a biased distance metric which, relative to a three-dimensional Euclidian distance metric: i) emphasizes distances within a emphasized-plane that is the tangent plane of the reference horizon and/or the plane of the upper or lower facet; ii) deemphasizes distances normal to the emphasized plane.

In some embodiments, a magnitude of a displacement by which the target vertex is moved exceeds the closest Euclidian distance between the target vertex and the representative manifold is at least 5% (or at least 10% or at least 15% or at least 20%).

In some embodiments, an angle between the local tangent of the reference horizon and a local tangent of the representative manifold deviates from a right angle by at least 5 degrees (or 10 degrees or 15 degrees or 20 degrees).

In some embodiments, the method further comprises: determining an angle sharpness and/or a volume of the transformed target cell; and contingent the results of the determining, merging the transformed target cell with an adjacent cell that is adjacent to the modified cell.

In some embodiments, the adjacent cell is selected to co-reside in the same geological sub-region, as determined by geological discontinuities, with the transformed target cell.

In some embodiments, the merging is contingent upon the modified cell having angle sharpness that exceeds a threshold angle sharpness.

In some embodiments, the merging is contingent upon at least one of: (i) an extent to which the volume of the transformed target cell is reducing by the cell transformation; and (ii) relative sizes of the transformed target cell and the adjacent cell.

In some embodiments, the geological discontinuity is selected from the group consisting of a fault and a disconformity.

Some embodiments relate to a system for transforming an input stratigraphic grid SGrid which represents a region including one or more geological discontinuities. The system comprising: a) computer memory configured to store the input SGrid; and b) a computer processor configured to transform the input SGrid, the computer processor configured, for at least one target cell that is local to one or more geological discontinuities, the target cell being selected from the group consisting of: i) a divided cell that is divided by one or more of the geological-discontinuities; and ii) a bordering cell that borders one or more the geological-discontinuities and/or one or more of the divided cells, to transform the target cell by displacing at least one target vertex of the target cell of the input SGrid in a selected direction that: i) is selected to approximate a local tangent of the reference horizon; and ii) is oriented from the target vertex to a representative manifold representing one of the geological discontinuities and/or an intersection between two or more of the geological discontinuities, wherein a magnitude of a displacement by which the target vertex is moved is determined according to a non-Euclidian distance between the target vertex of the target cell of the input SGrid and the representative manifold.

Some embodiments relate to a computer readable medium comprising program instructions. When executed the program instructions are operable to transform an input stratigraphic grid SGrid which represents a region including one or more geological discontinuities by transforming one more target local to one or more geological discontinuities, the target cell being selected from the group consisting of: i) a divided cell that is divided by one or more of the geological-discontinuities; and ii) a bordering cell that borders one or more the geological-discontinuities and/or one or more of the divided cells, the transforming including displacing at least one target vertex of the target cell of the input SGrid in a selected direction that: i) is selected to approximate a local tangent of the reference horizon; and ii) is oriented from the target vertex to a representative manifold representing one of the geological discontinuities and/or an intersection between two or more of the geological discontinuities, wherein a magnitude of a displacement by which the target vertex is moved is determined according to a non-Euclidian distance between the target vertex of the target cell of the input SGrid and the representative manifold.

BRIEF DESCRIPTION OF THE DRAWINGS

FIGS. 5B-5F illustrate exemplary intermediate grids.

DESCRIPTION OF EMBODIMENTS

The claims below will be better understood by referring to the present detailed description of example embodiments with reference to the figures. The description, embodiments and figures are not to be taken as limiting the scope of the claims. It should be understood that not every feature of the presently disclosed methods, apparatuses, and computer readable media having stored thereon computer code for logical protocol command disambiguation is necessary in every implementation. It should also be understood that throughout this disclosure, where a process or method is shown or described, the steps of the method may be performed in any order or simultaneously, unless it is clear from the context that one step depends on another being performed first. As used throughout this application, the word "may" is used in a permissive sense (i.e., meaning "having the potential to'), rather than the mandatory sense (i.e. meaning "must").

Figure 7:
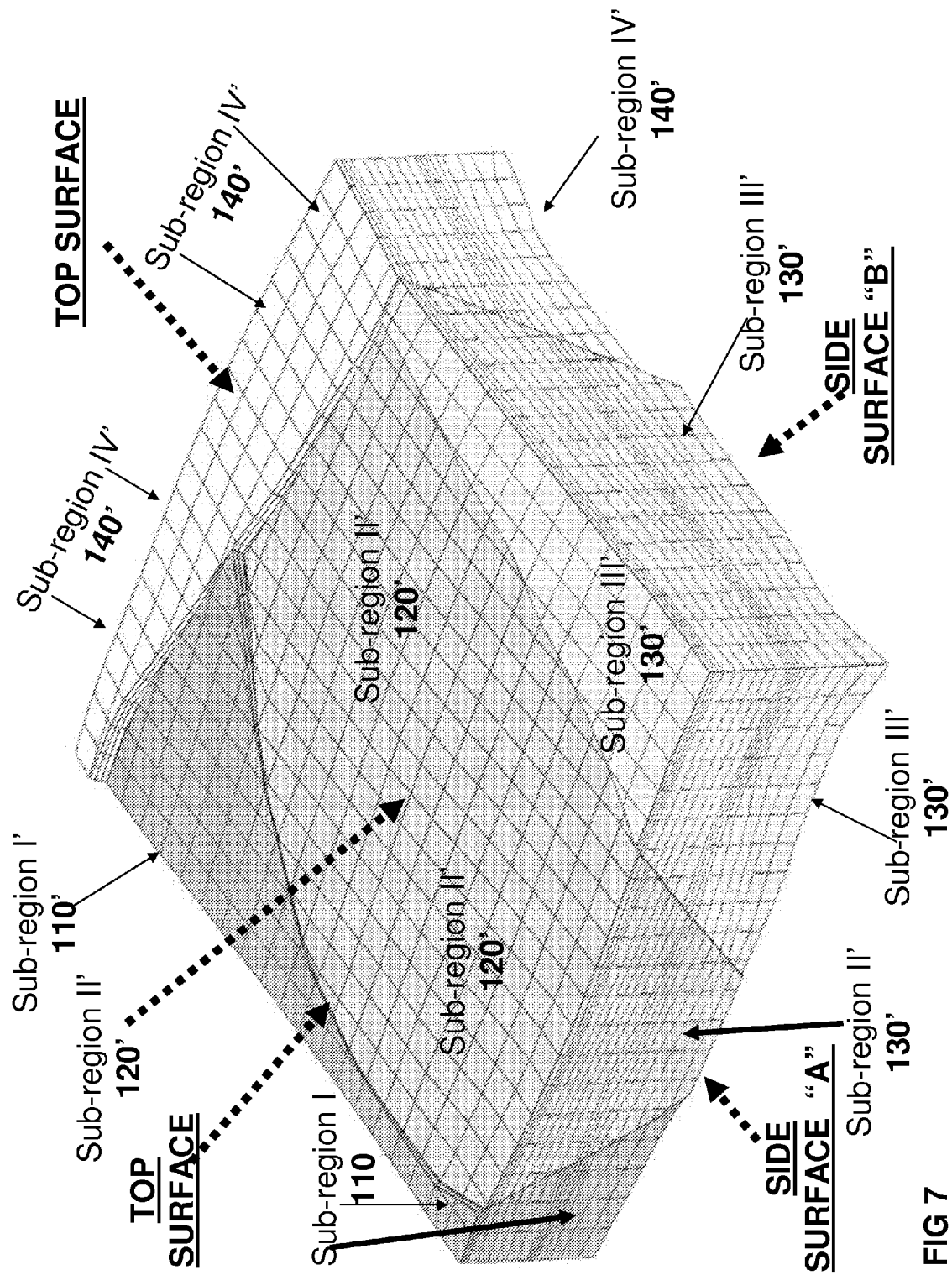
FIGS. 7-9, 15-16 illustrate SGrids that have been transformed by a grid smoothing technique.
Figure 8A:
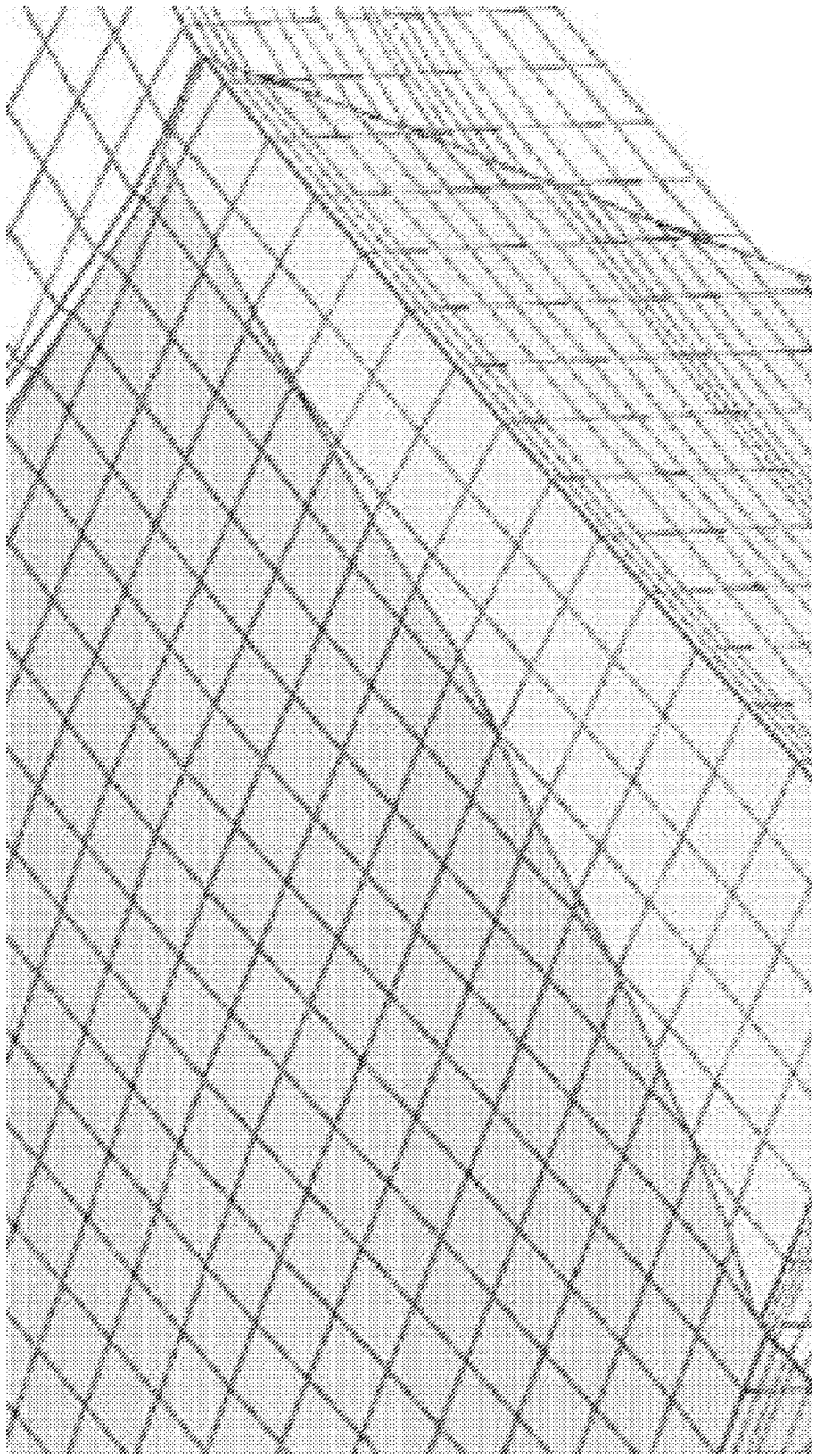
Figure 8B:
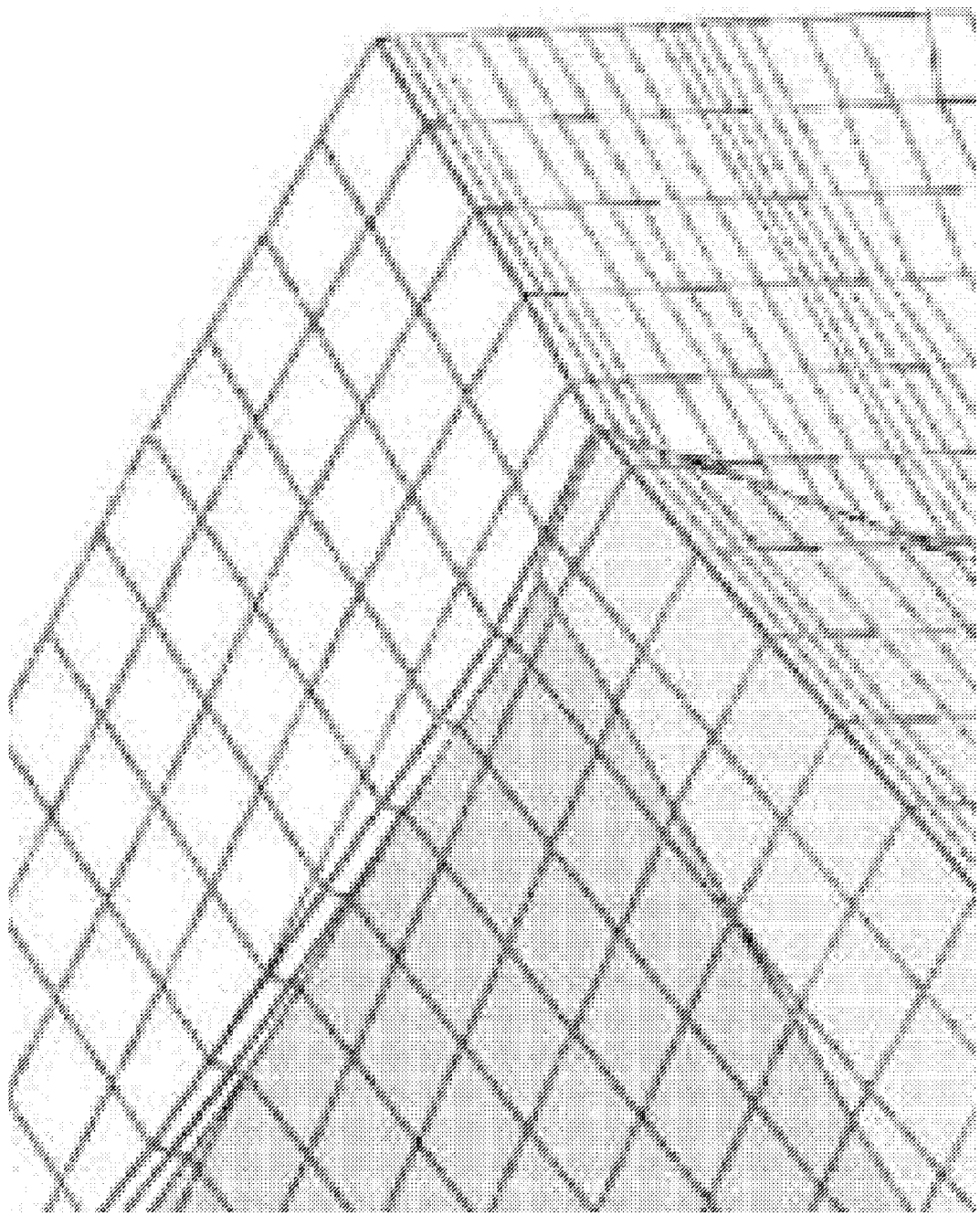

Discussion of FIGS. 7-9—Transformation (e.g. Smoothing) of an SGrid

Figure 5A:
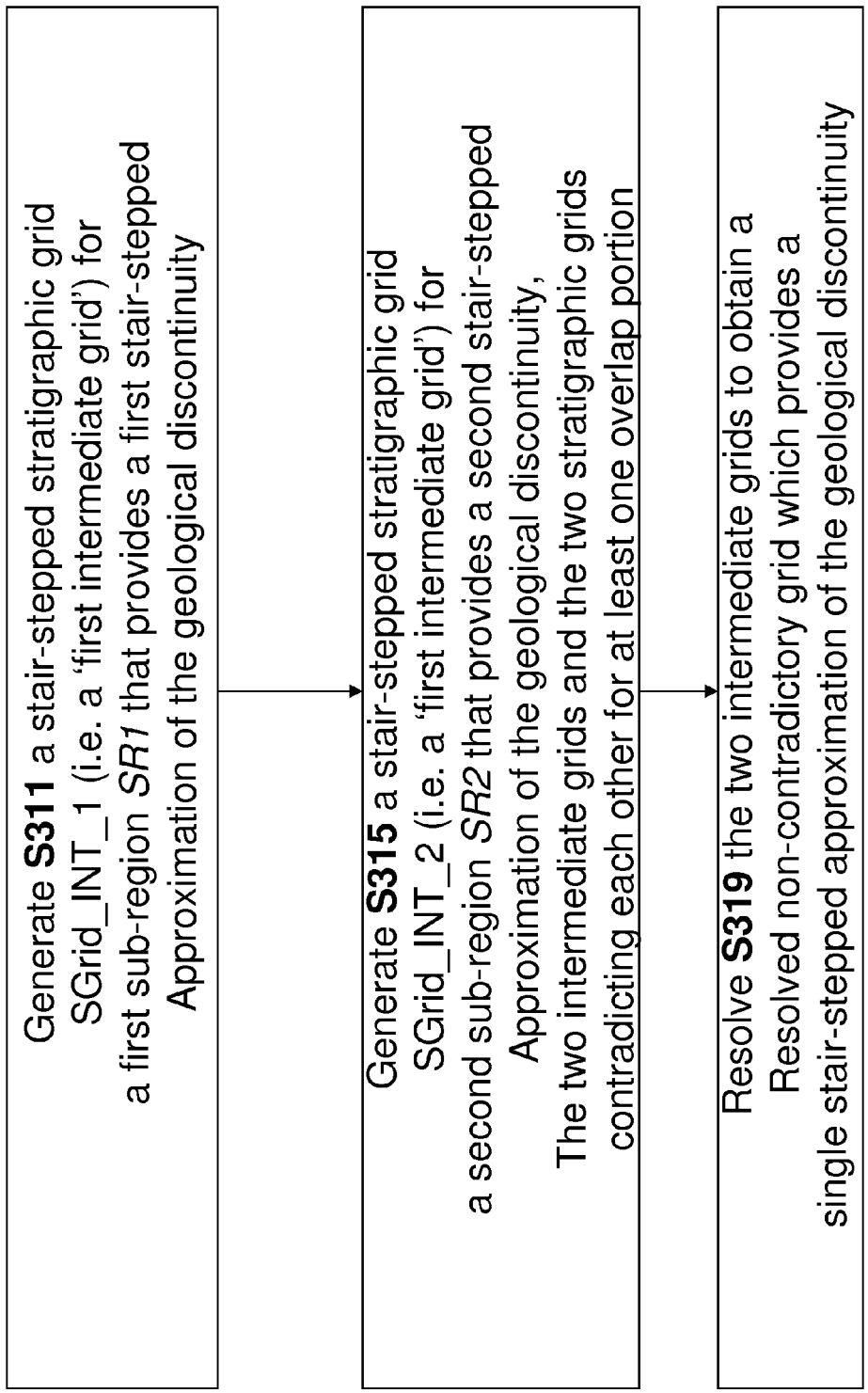
FIG. 5A is a flow chart of a routine for handling intermediate grids.
Figure 5B:
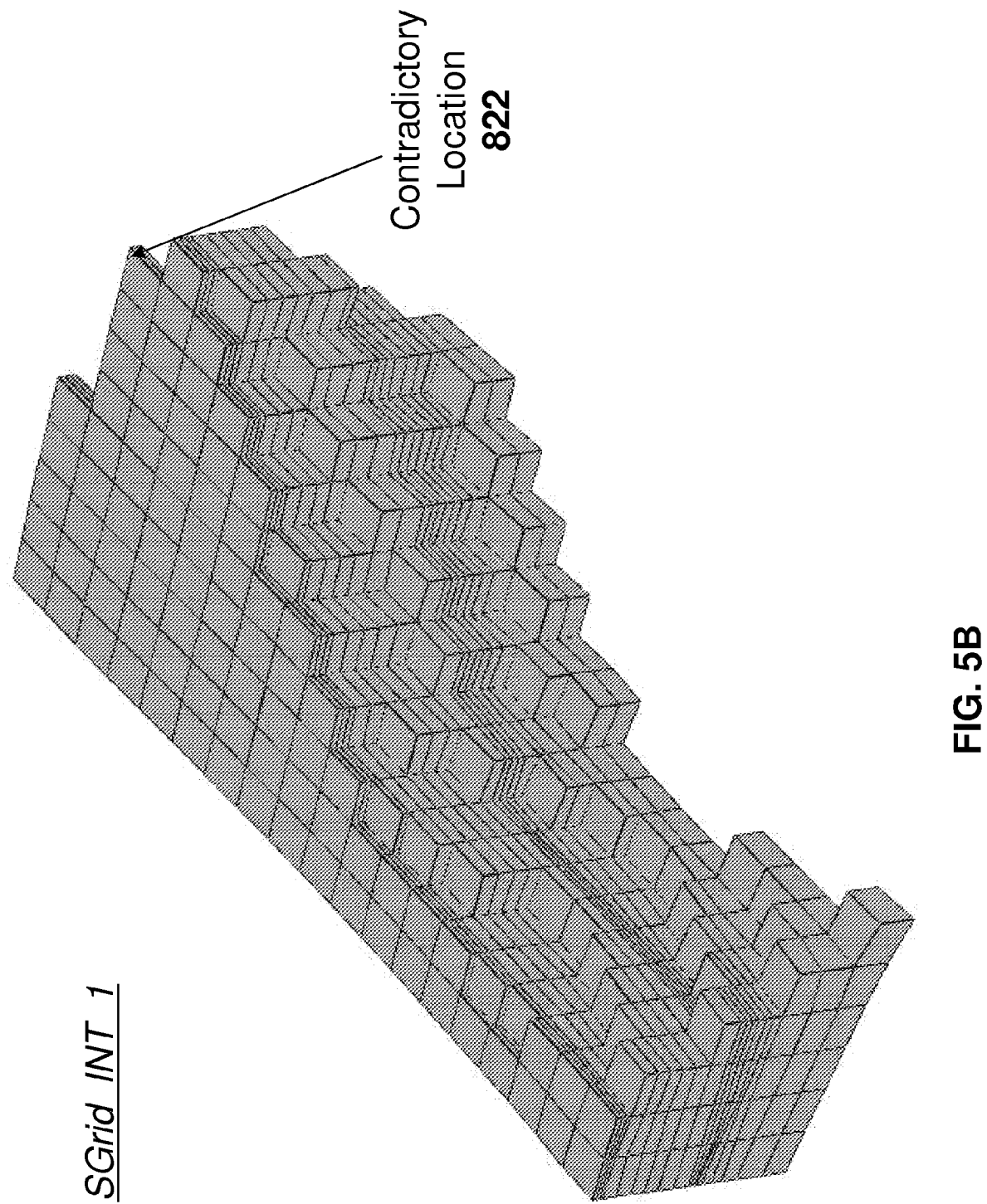
Figure 5C:
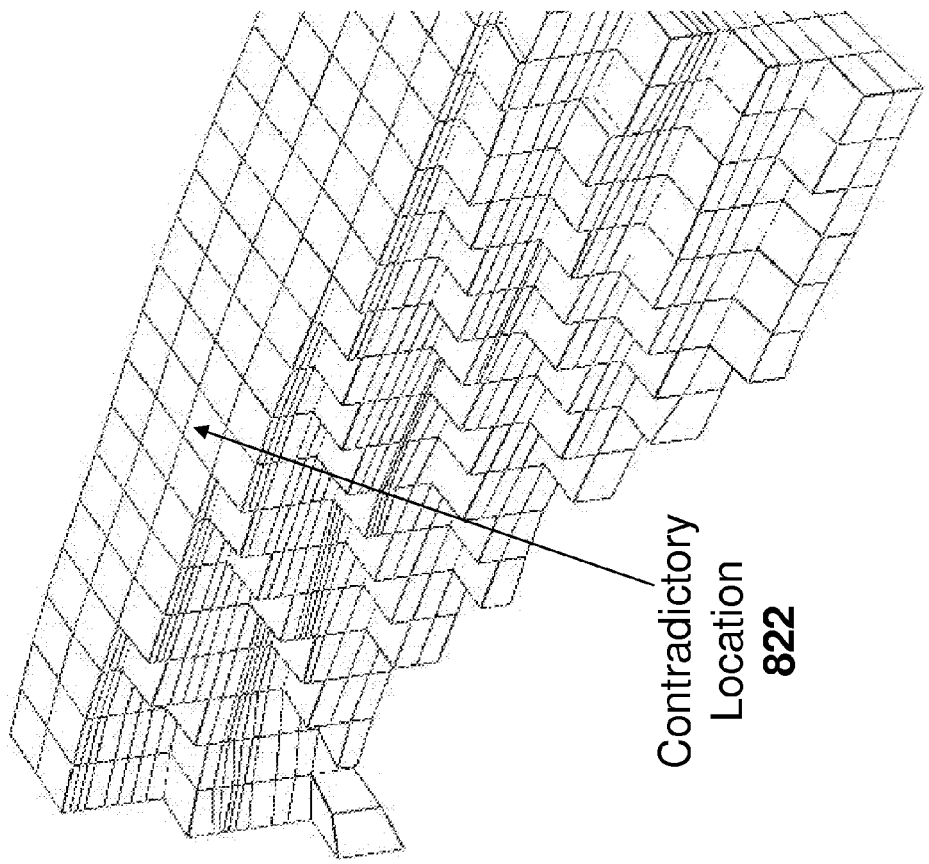
Figure 5D:
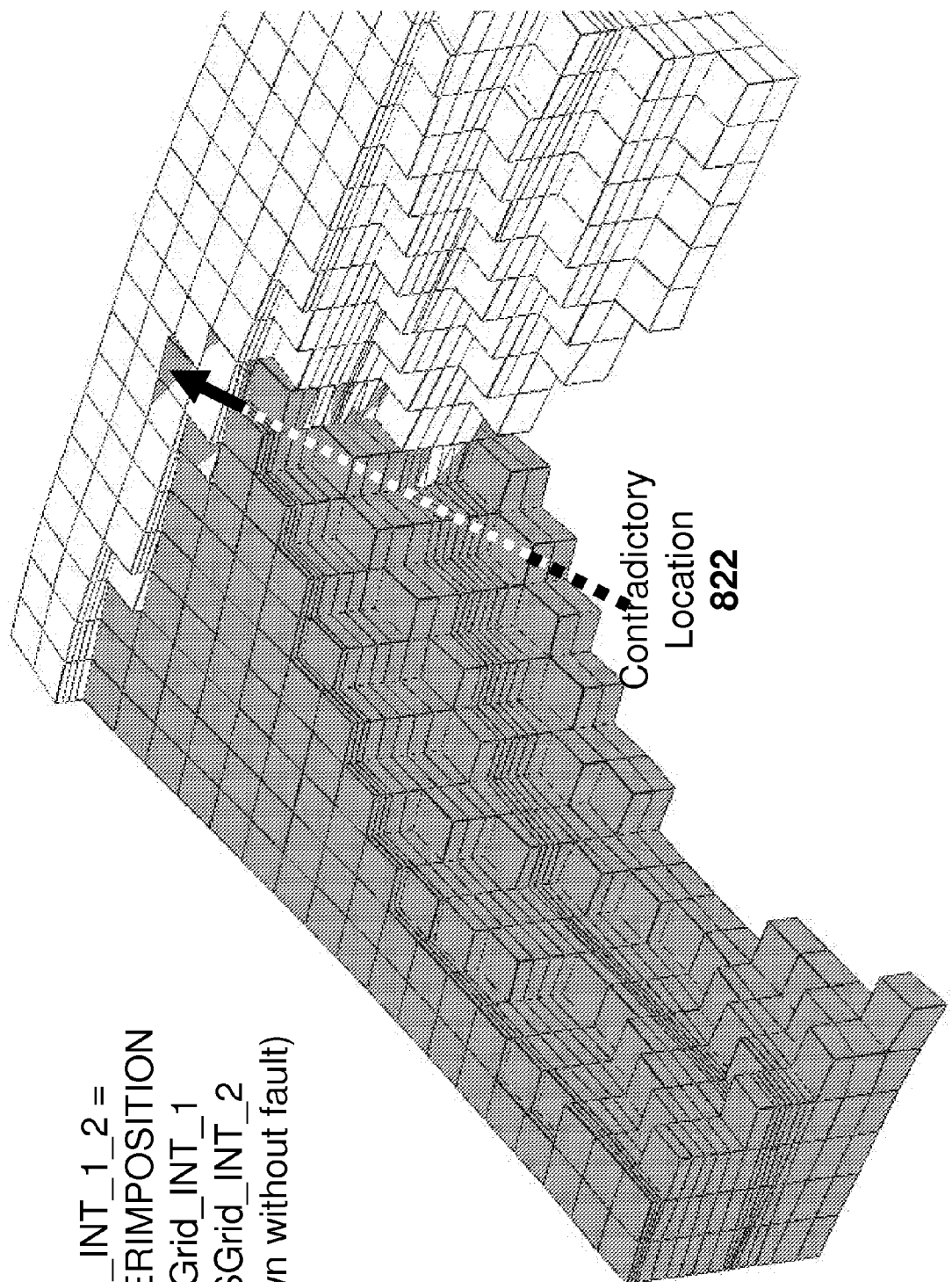
Figure 5F:
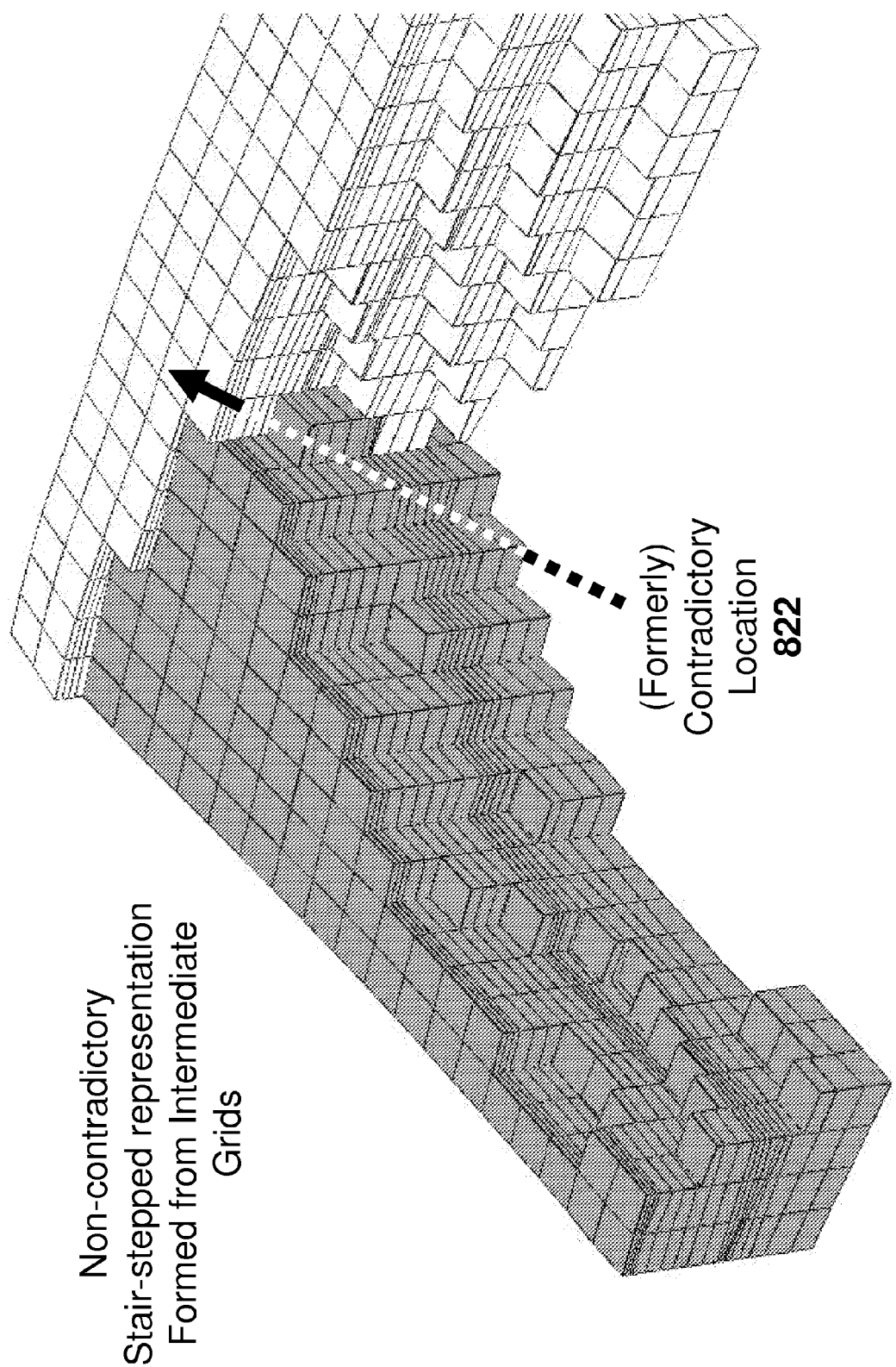

Embodiments of the present invention relate to techniques and apparatus for transforming an SGrid by smoothing stair-steps approximations of geological discontinuities (e.g. faults). In one non-limiting example, the 'stair step' input grid to which this technique may be applied is a so-called 'intermediate' grid (for example, a 'self-contradicting' SGrid having overlapping cells as illustrated in FIG. 5D).

Figure 1:
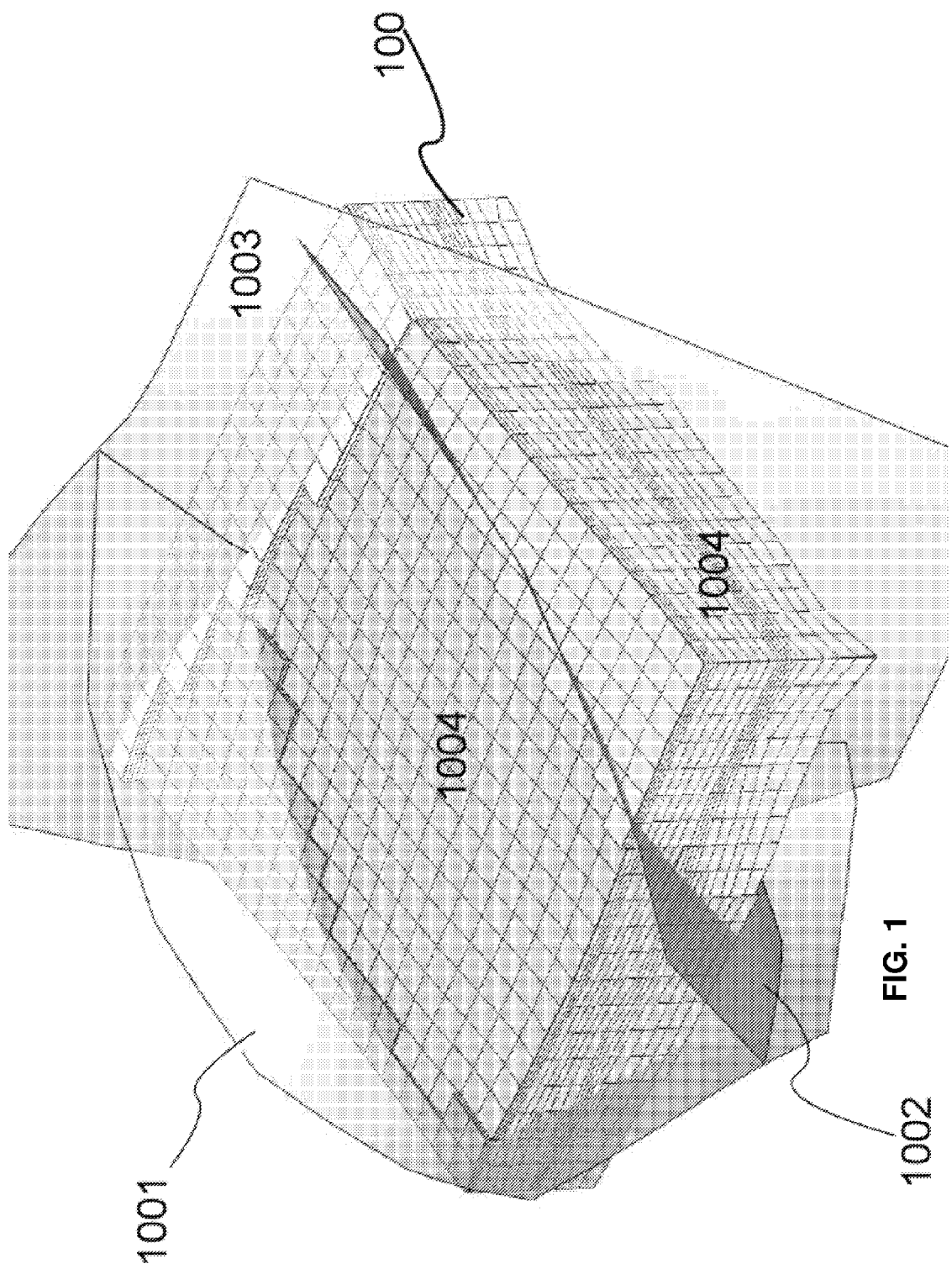
FIGS. 1-4 and 6 illustrate SGrids that provide a stair-stepped approximation of geological discontinuity.
Figure 2A:
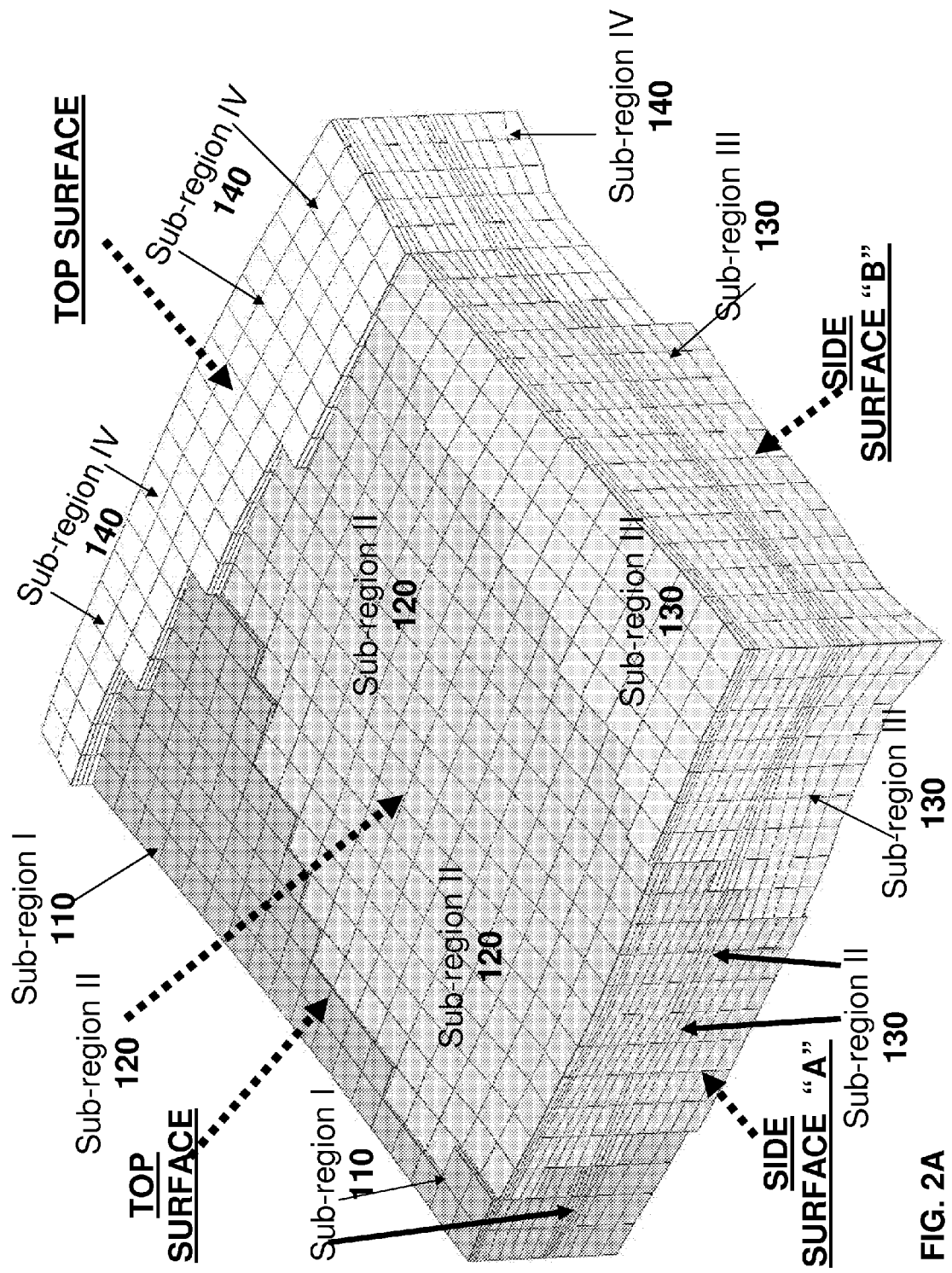

FIG. 7 illustrates the result of applying a 'smoothing' or 'cell transforming' or 'vertex moving' routine to the SGrid which has a stair-stepped approximation of geological discontinuity (for example, the 'intermediate grid' associated with FIG. 2A).

Thus, if one compares the non-limiting example of FIG. 7 to FIG. 2A, it is possible to observe that: (i) the basic cell topology of the SGrid into the four sub-regions is approximately the same; and (ii) the boundary between sub-regions (i.e. where the boundary approximates the geological discontinuity) is in FIG. 7 is 'smoother' than in FIG. 2A. This also may be observed by comparing FIG. 3 with FIG. 8.

This 'smoothing technique' is described below with reference to the flow chart of FIG. 10A.

Figure 2B:
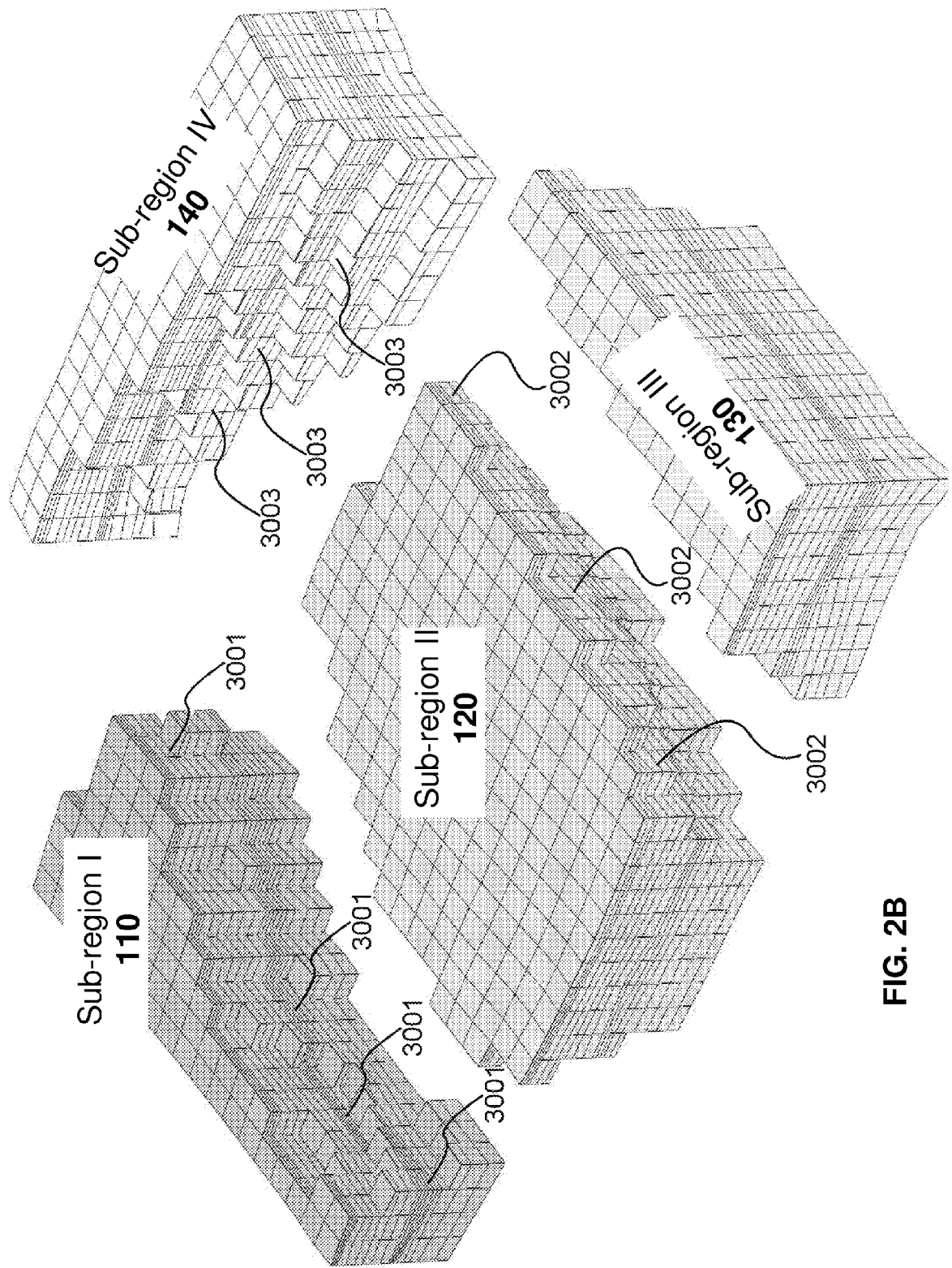
Figure 9A:
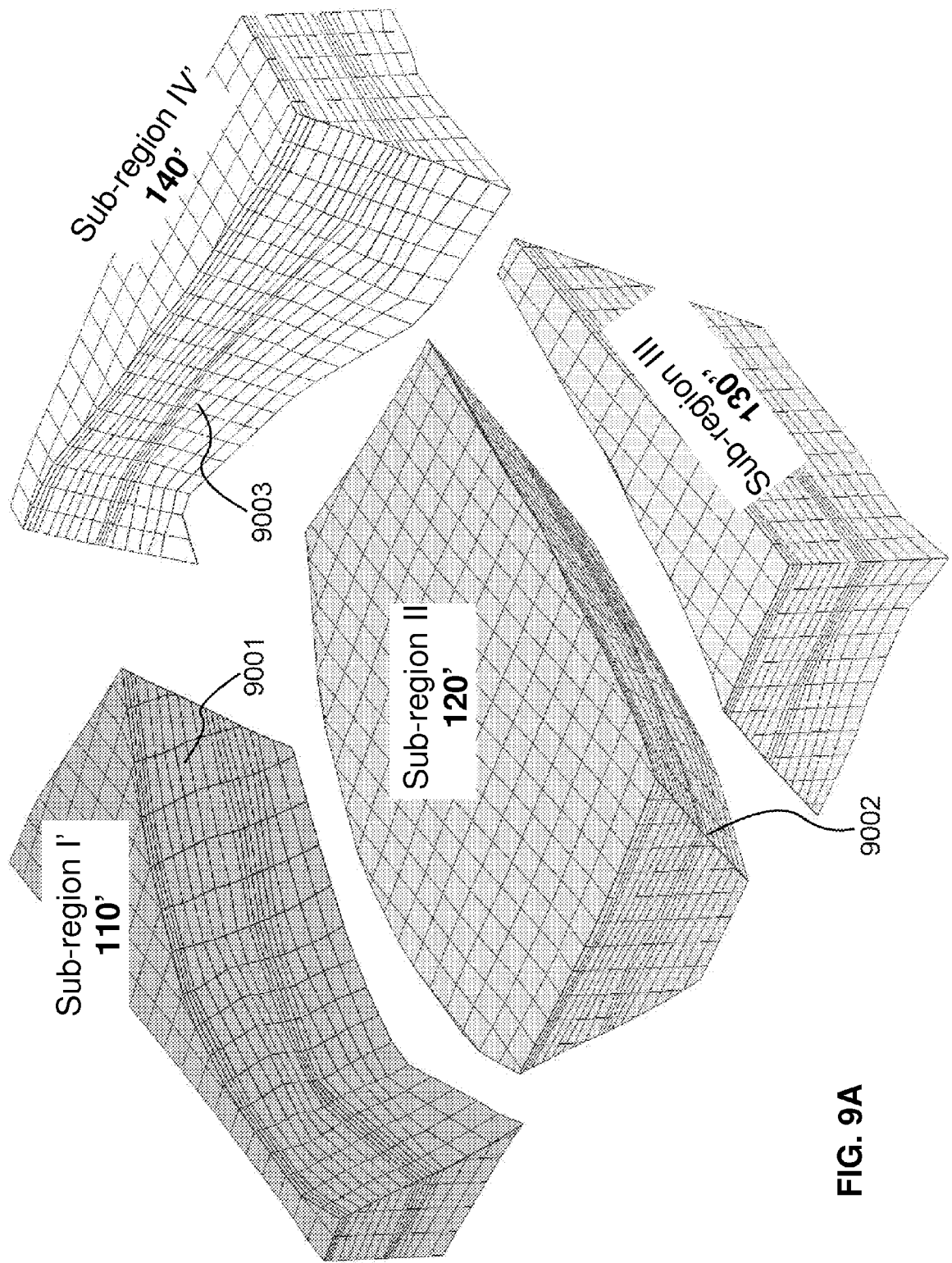

FIG. 9A provides an exploded view of the same transformed SGrid (the exploded view of the transformed SGrid of FIG. 9A may be compared with the exploded view of the 'input' SGrid of FIG. 2B). Similar features are thus illustrated by comparing FIGS. 9A with 2B.

Figure 9B:
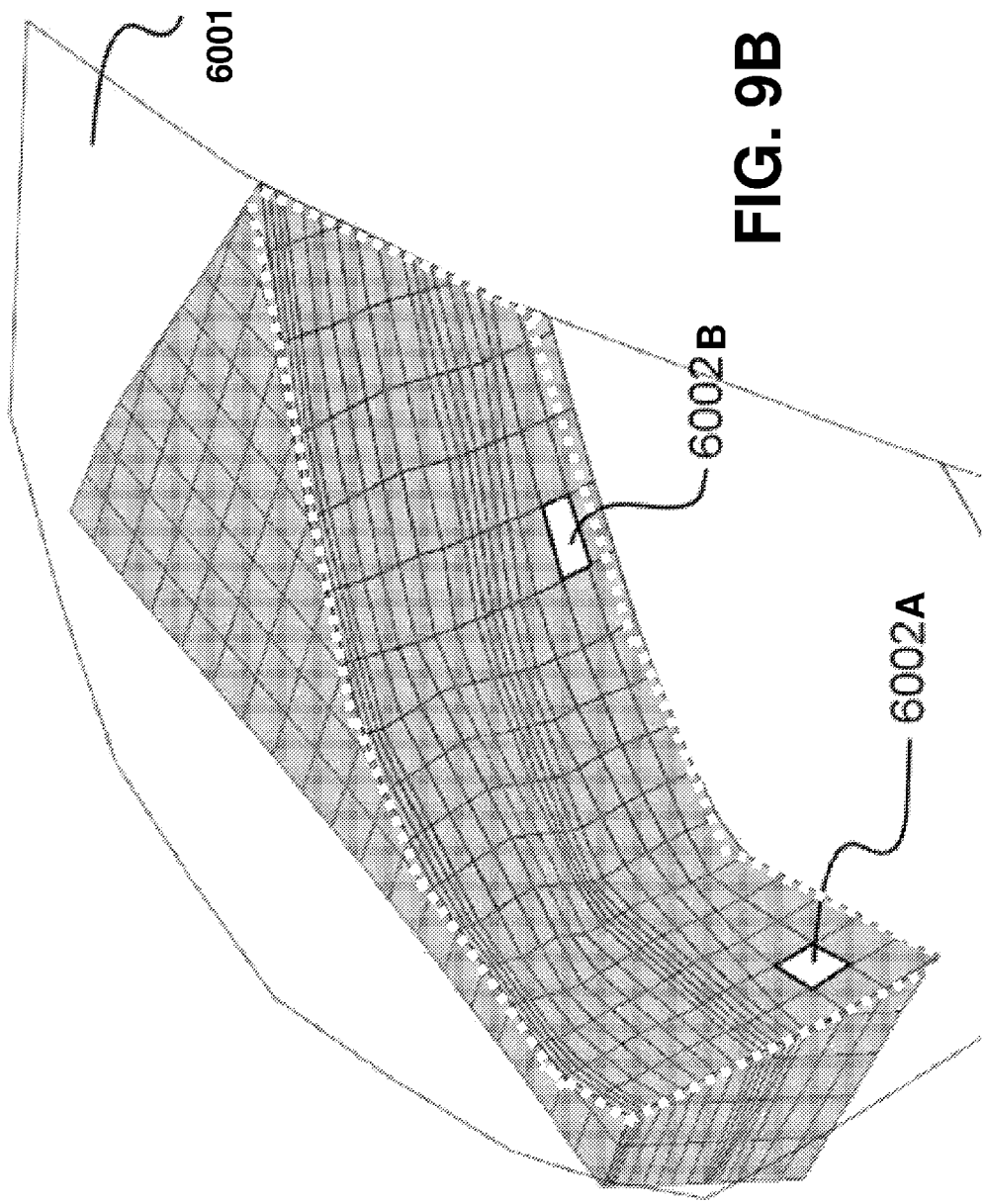
Figure 10A:
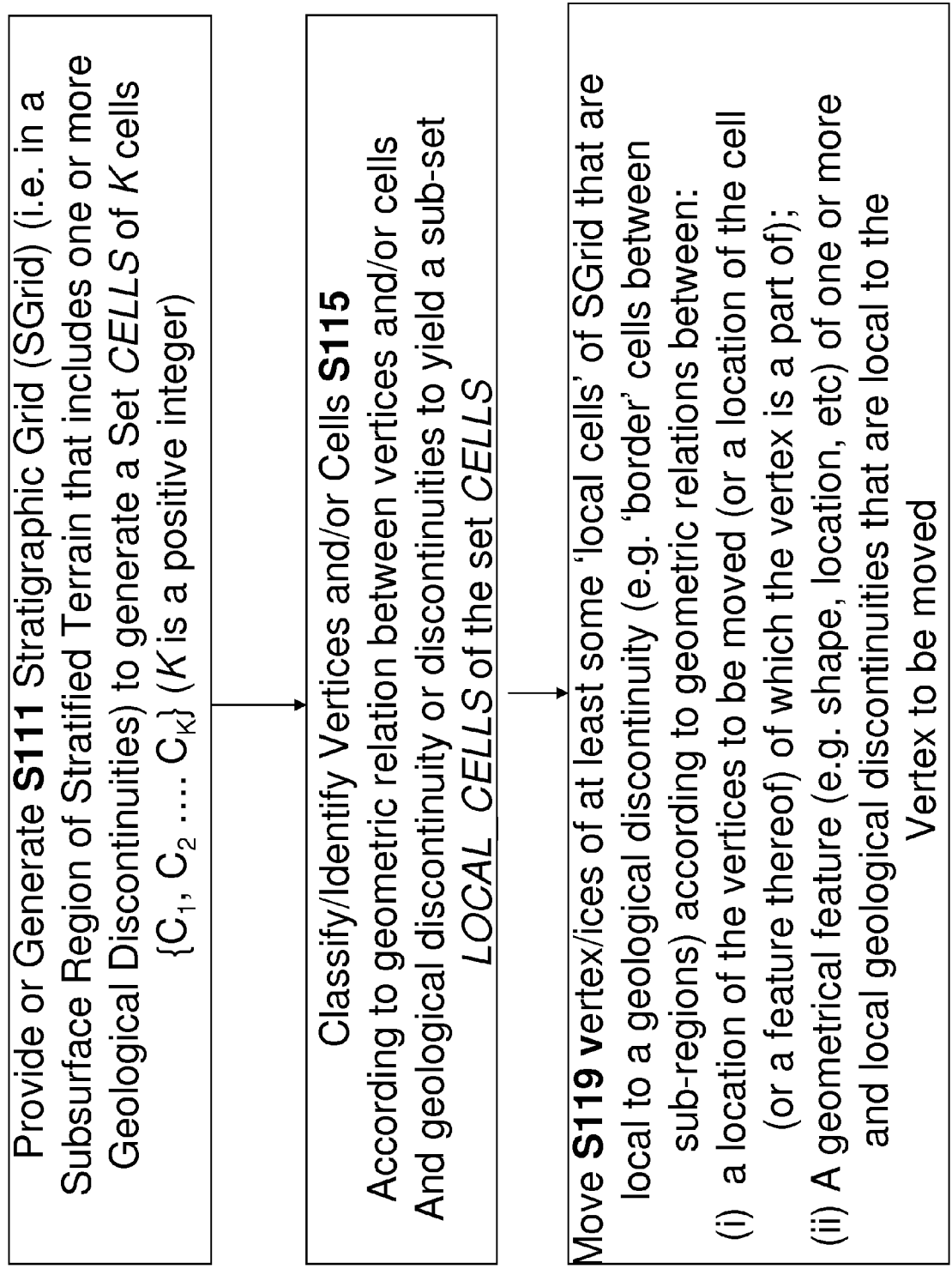
FIGS. 10A-10B are flow charts of routines related to grid smoothing techniques.

Furthermore, comparison of the view of sub-region I' 110' of FIG. 9B (i.e. of the 'transformed' SGrid) with the view of sub-region I 110 of FIG. 2C (i.e. of the 'input' SGrid) also indicates that the 'border surface' between sub-regions I and II that is enclosed within the broken white lines (i.e. which approximates fault 1001 in both FIGS. 2C and 9B) has been 'smoothed' by the routine of FIG. 10A. One salient feature of the non-limiting example of FIG. 9B is that despite the smoothing, the 'border' facets of the surface enclosed within the dotted white line (i.e. including facets 6002A and 6000B) have predicable regular shapes. In the example of FIG. 9B, these "inter-sub-region border facets" have quadrilateral shapes—for example, substantially rectangular shaped (the topology of the quadrangular lateral facets is preserved but their geometry, and in particular their area, may not be preserved). This is in contrast with SGrids generated by the primal cookie cutter technique (see, for example, FIG. 5 of US 2008/023454) which have an unpredictable number of vertices.

In some embodiments, the smoothed SGrid may be useful to facilitate modeling deformations of the geological layers throughout geological time. For example but not limited to, the SGrids may be utilized by geomechanical algorithms and unfolding algorithm designed for backward modeling of the deformations of the geological layers throughout geological time. In such applications, the fault blocks on both sides of a fault must slide on each other. In such applications, the smooth approximation of the faults may provide superior results than those attainable using a stair-step approximation of the faults.

In yet another example, it is possible to input the smoothed grid to certain flow simulators which directly take into account the orientation of the common facet shared by a pair of adjacent cells. In this use case, the faults can be approximated by facets parallel to the faults. In this use case, once again, the smooth approximation of the faults may provide superior results than those attainable using a stair-step approximation of the faults.

Furthermore, the present inventors believe that the smoothing (and/or vertex moving or cell transforming) technique disclosed herein may also be useful for geological 3D-balanced-unfolding and basin modeling.

Figure 10B:
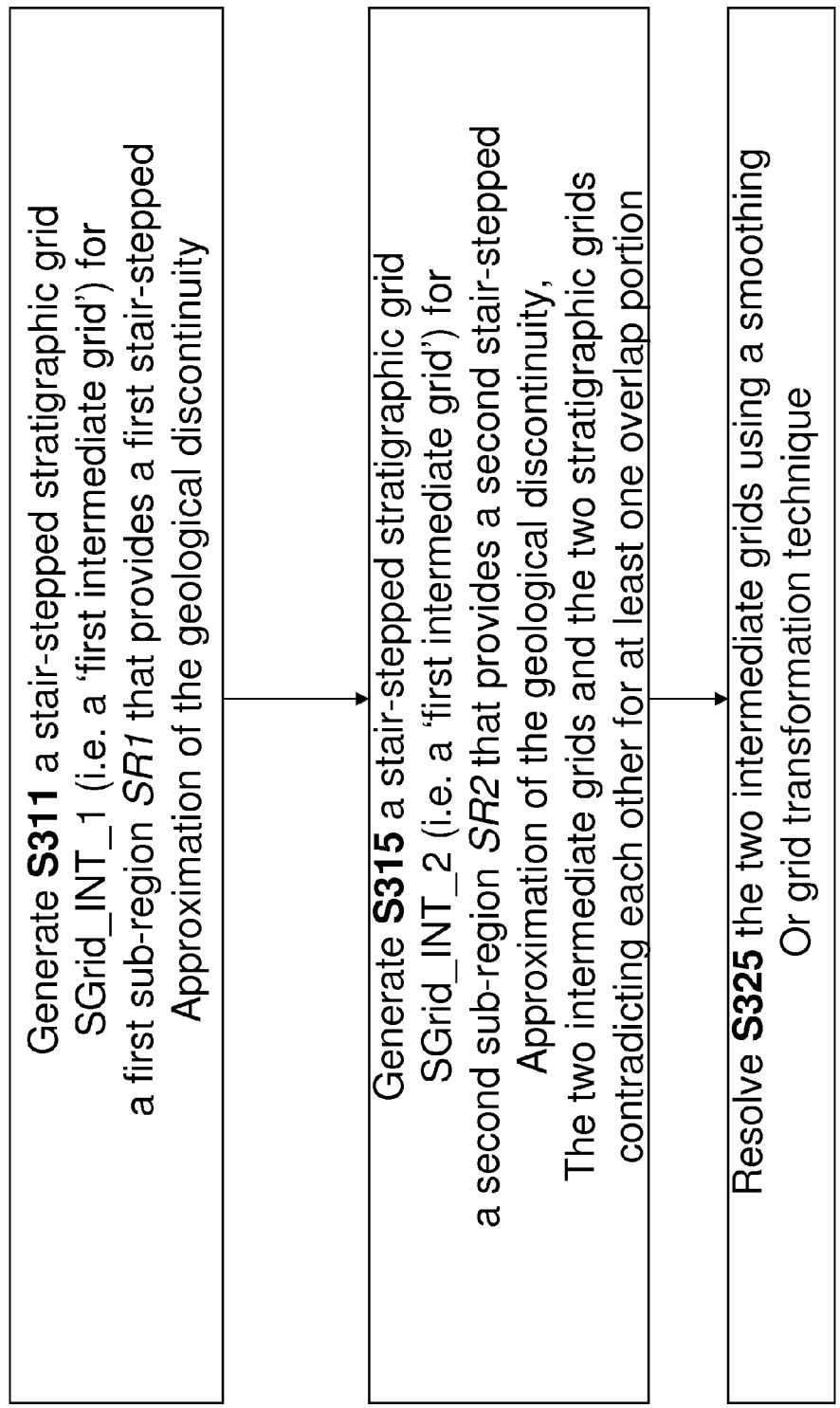

Discussion of FIG. 10A-10B—Flow Chart of a Routine for Transforming SGrids

FIG. 10A is a flow chart of an exemplary routine for transforming an SGrid. In some embodiments, the routine of FIG. 10 is useful for 'smoothing' a stair-step approximation of a geological discontinuity. In one non-limiting example, the 'input' of the routine of FIG. 10A is one of the 'intermediate grids' (see for example, FIGS. 5B-5E)—(i.e. which provides a 'stair-step' approximation of geological discontinuities) and the 'output' of the routine of FIG. 10 is the SGrid of FIGS. 7, 9.

In some embodiments, the input of the technique of FIG. 10A is an SGrid that includes one or more stair-stepped approximations of a single geological discontinuity even if this SGrid is self-contradictory and/or includes overlapping cells (for example, see FIG. 5D). By smoothing these self-contradictory stair-steps, it is possible to simultaneously (i) resolve the 'contradictions' within the SGrid (see FIG. 5E) in a manner which removes overlapping cells and which eliminates self-contradictory locations; (ii) approximates the fault in a smoother way which does not require cells which are internally divided by a fault; and (iii) nevertheless, may generate an SGrid with topologically quadrilateral lateral facets (topology is preserved but the geometry may not be preserved) at the 'border,' thereby preserving one potential advantage of the 'dual cookie cutter' technique.

In step S111, an SGrid is provided or generated—in one non-limiting example, the dual-cookie cutter technique (or one or more sub-routines of this technique) of US 2008/0243454, may be employed.

The SGrid includes a set of CELLS $\{C_1, C_2 \ldots C_K\}$.

In one example, the SGrid generated by the dual cookie cutter provides a stair-step representation of one or more geological discontinuities that divide between multiple 'sub-regions' of the Earth's sub-surface. In this case, each cell may be a member of a series of 'sub-region' of cells where the borders between the sub-regions of cells are determined according to geological discontinuity. Thus, for the case where there are L sub-regions (L is a positive integer), it is possible to define L sub-sets of CELLS–CELL_SR$_1$ defined as the set of cells that are within sub-region 1 SR$_1$, CELL_SR$_2$ defined as the set of cells that are within sub-region 2 SR$_2$, etc. The union of all of the CELL_SR$_i$ (i is a positive integer that is less than or equal to L) may be equal to the total set of cells CELLS.

According to the present 'use case' (i.e. where the 'input' the provided SGrid provides a stair-step representation of one or more geological discontinuities that divide between multiple 'sub-regions' of the Earth's sub-surface), each sub-set of cells CELL_SR$_i$ of sub-region SR$_i$ may include a sub-set of the sub-set of cells CELL_SR$_i^j$ that are 'border cells.' These 'border cells' border a neighboring sub-region SR$_j$ (j is a positive integer, i≠j). Collectively cells CELL_SR$_i^j$ are (i) cells within sub-region SR$_i$ that border sub-region SR$_j$ (ii) approximate a geological discontinuity that approximately demarcates a border the two neighboring sub-regions SR$_i$ and SR$_j$. In some embodiments, facets of the border cells CELL_SR$_i^j$ may approximate the geological discontinuity (see the region within the broken white line of FIG. 2C—the cells CELL_SR$_i^j$ and their facets which face to sub-region II 120 approximate the fault 1001).

Figure 3A:
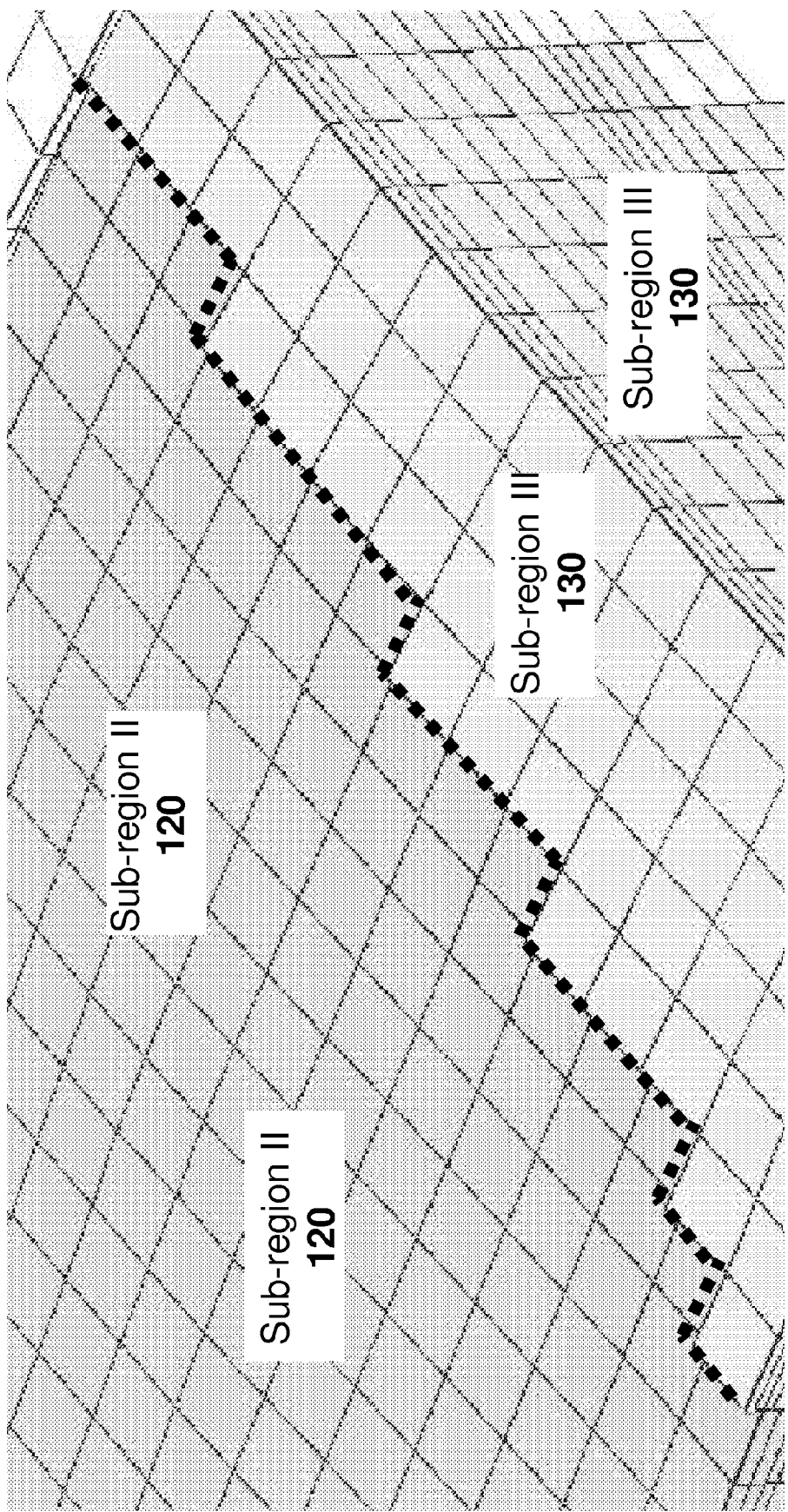
Figure 3B:
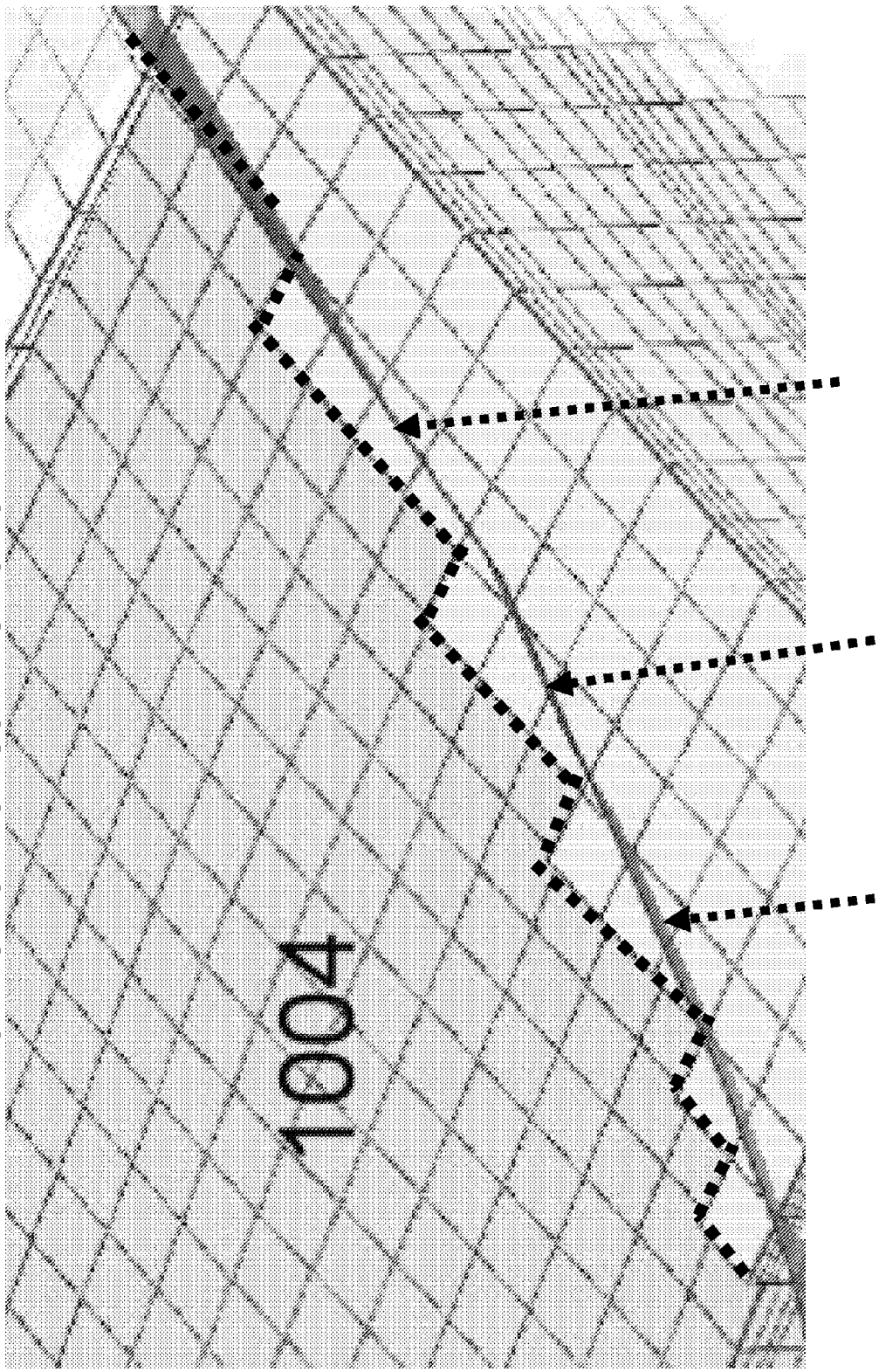
Figure 3C:
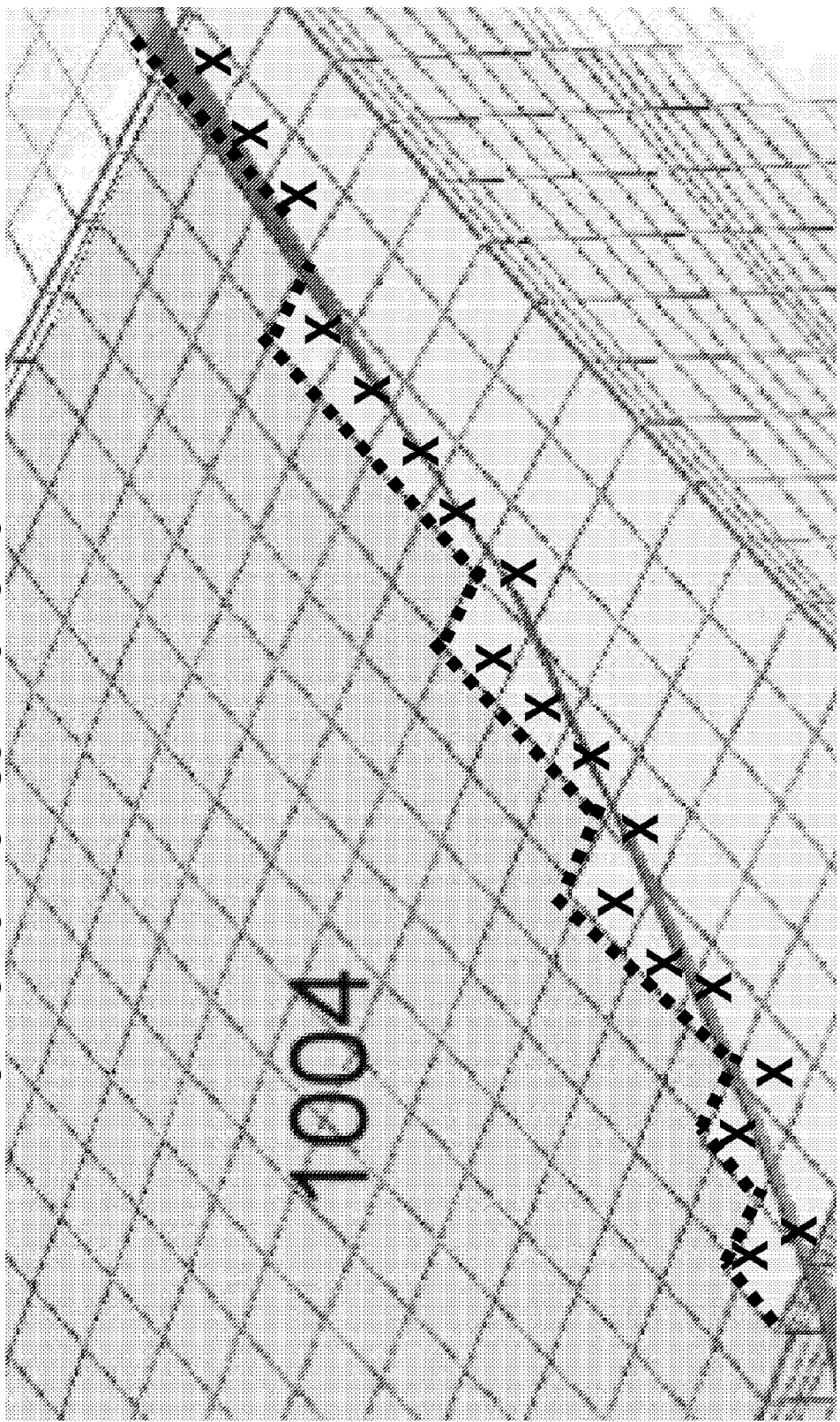
Figure 3D:
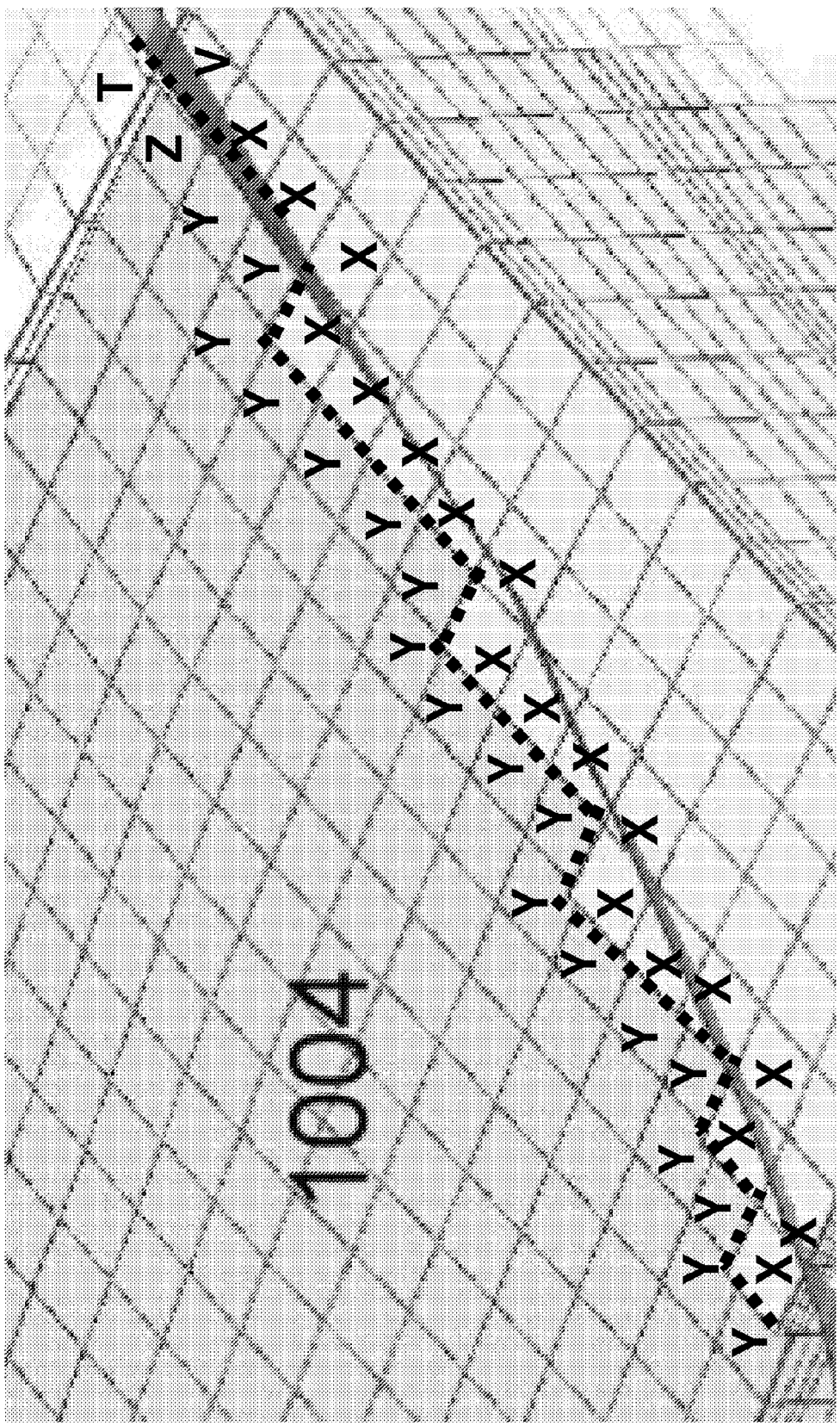
Figure 3E:
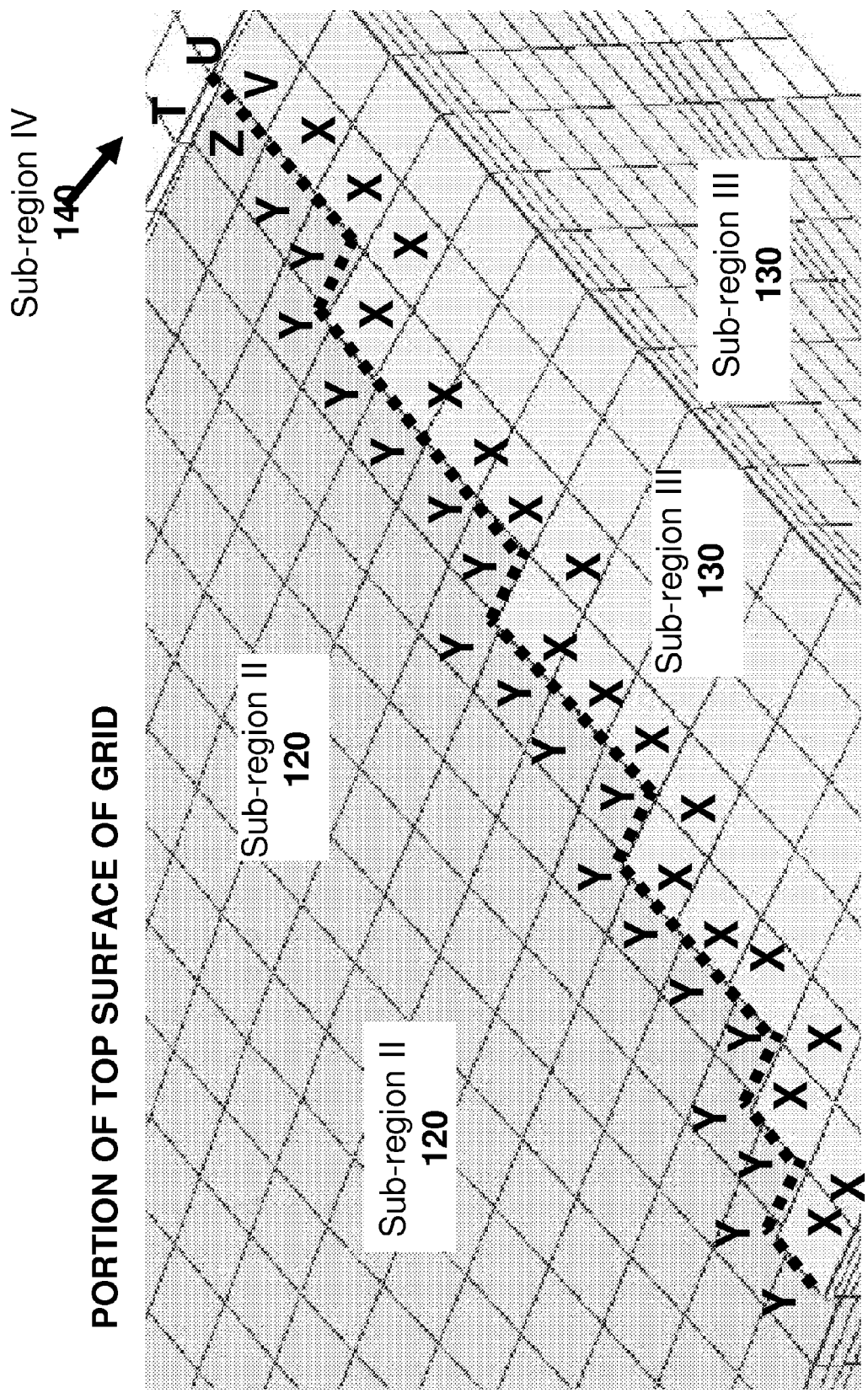
Figure 3F:
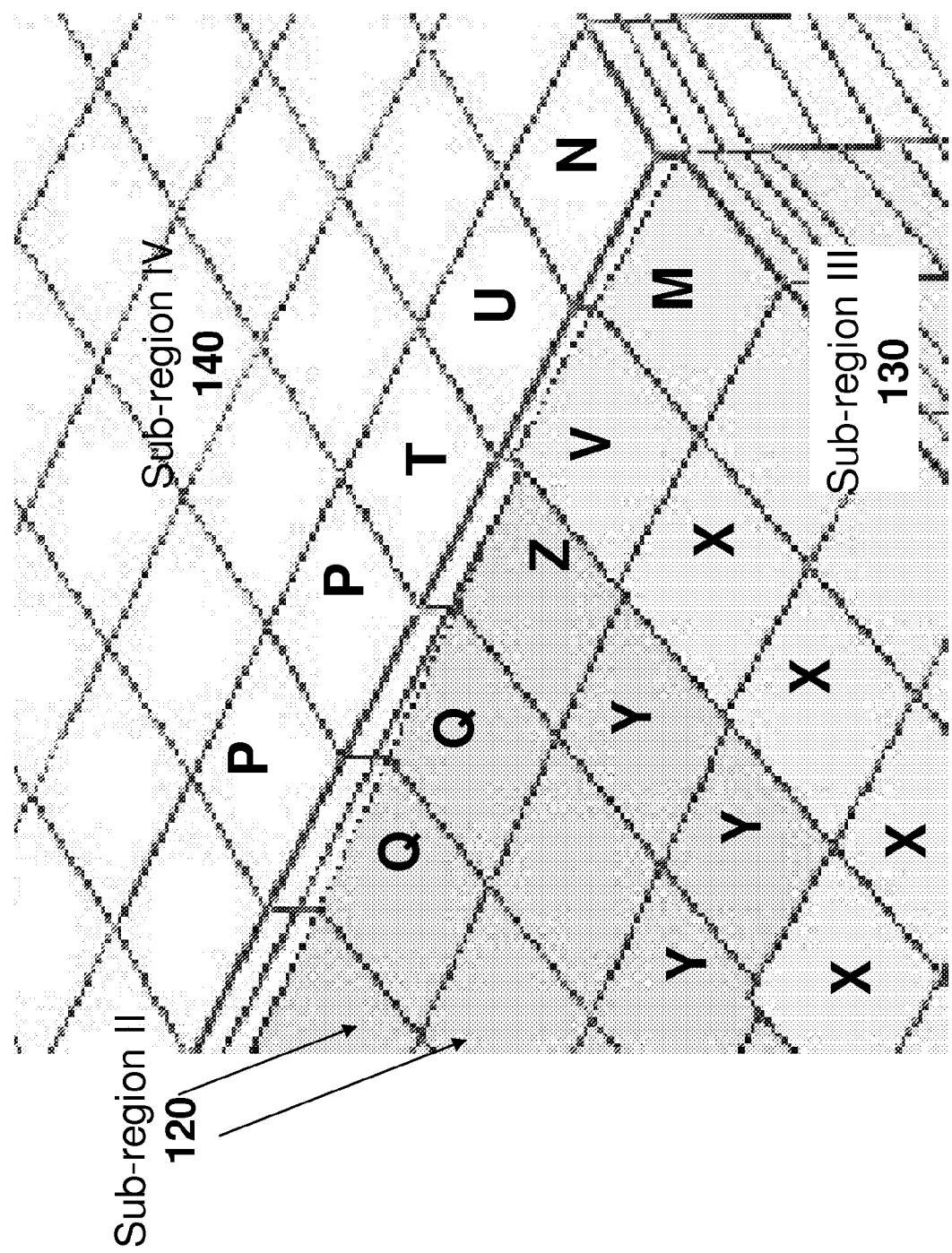
Figure 4A:
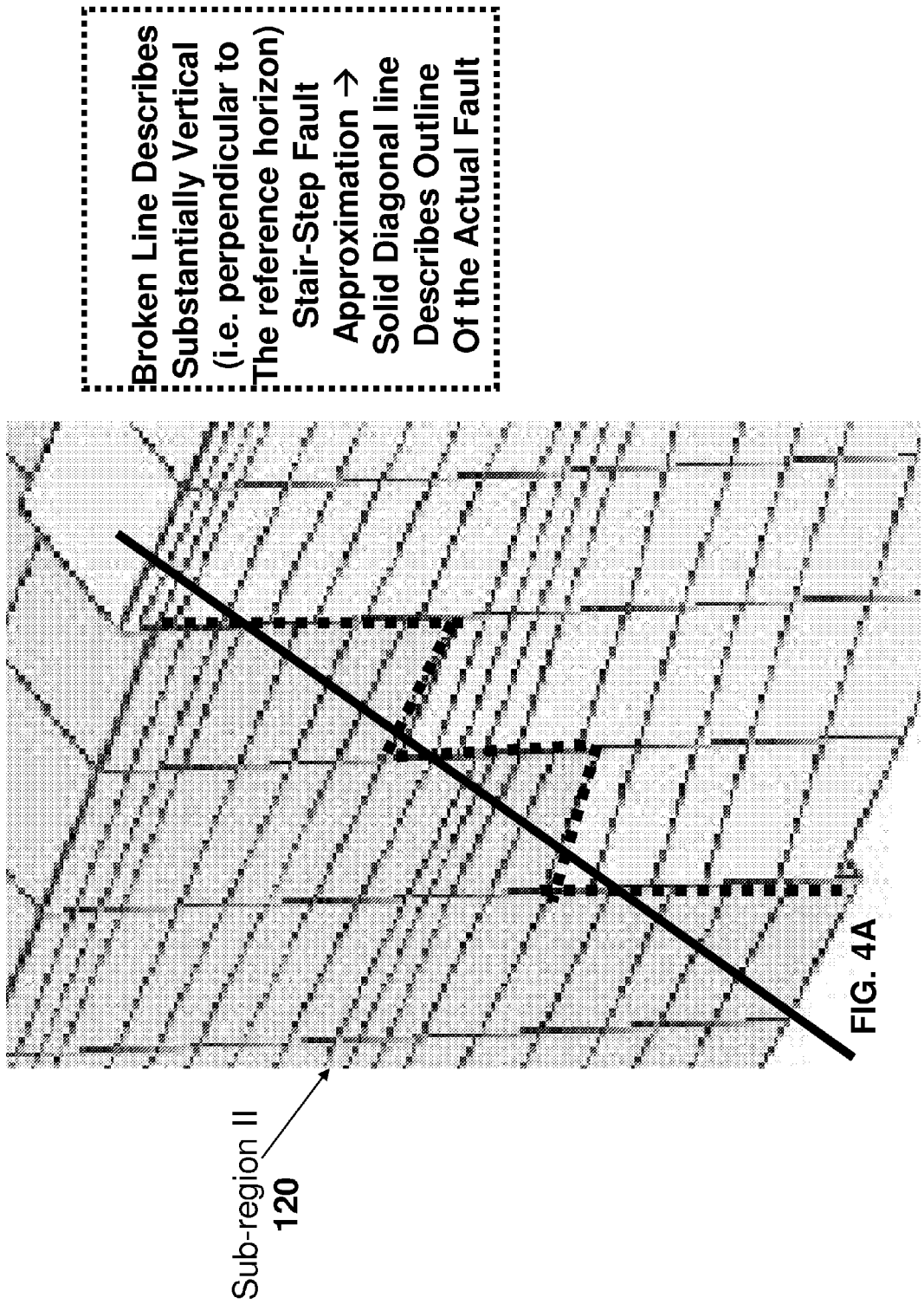
Figure 4B:
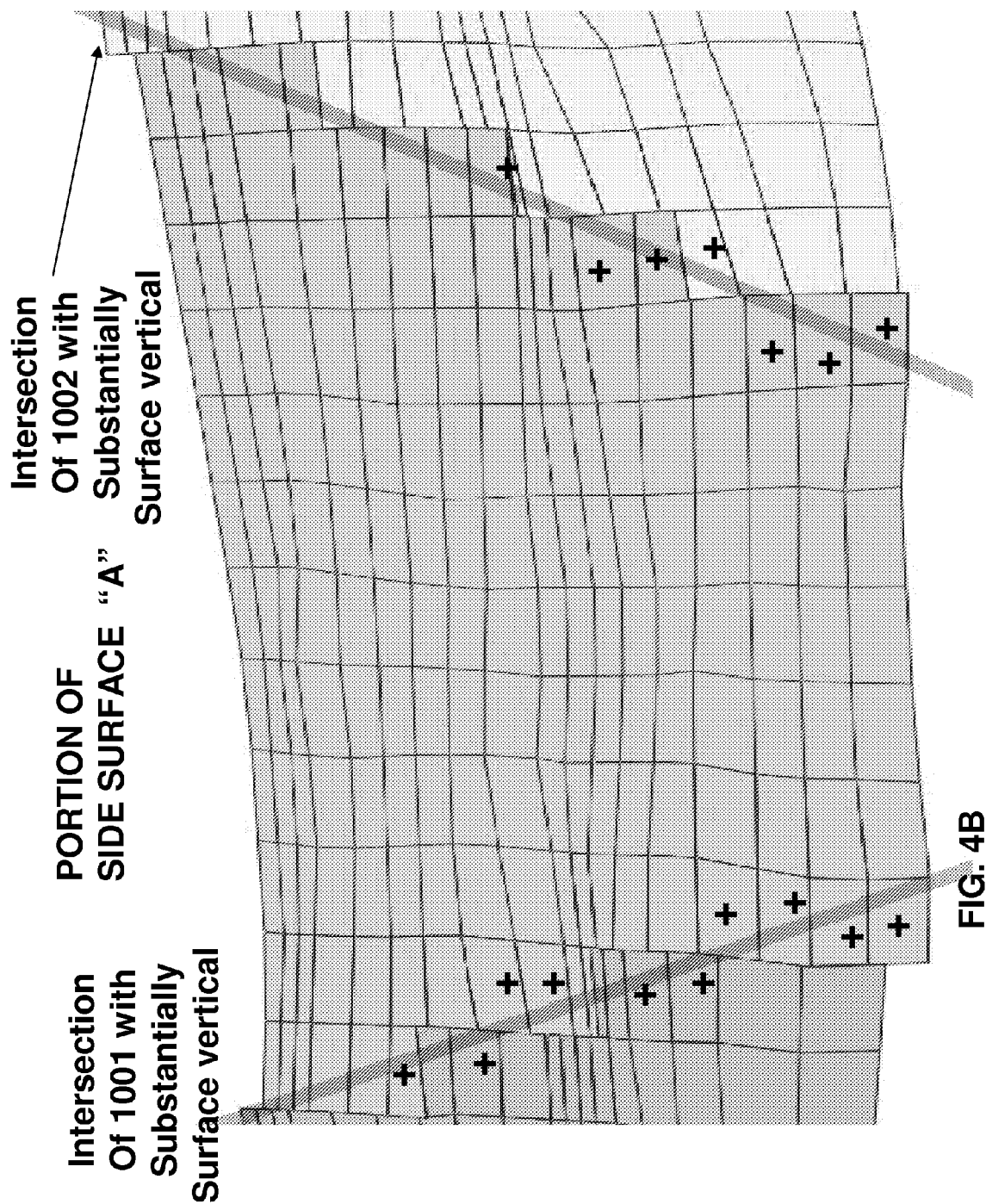
Figure 4C:
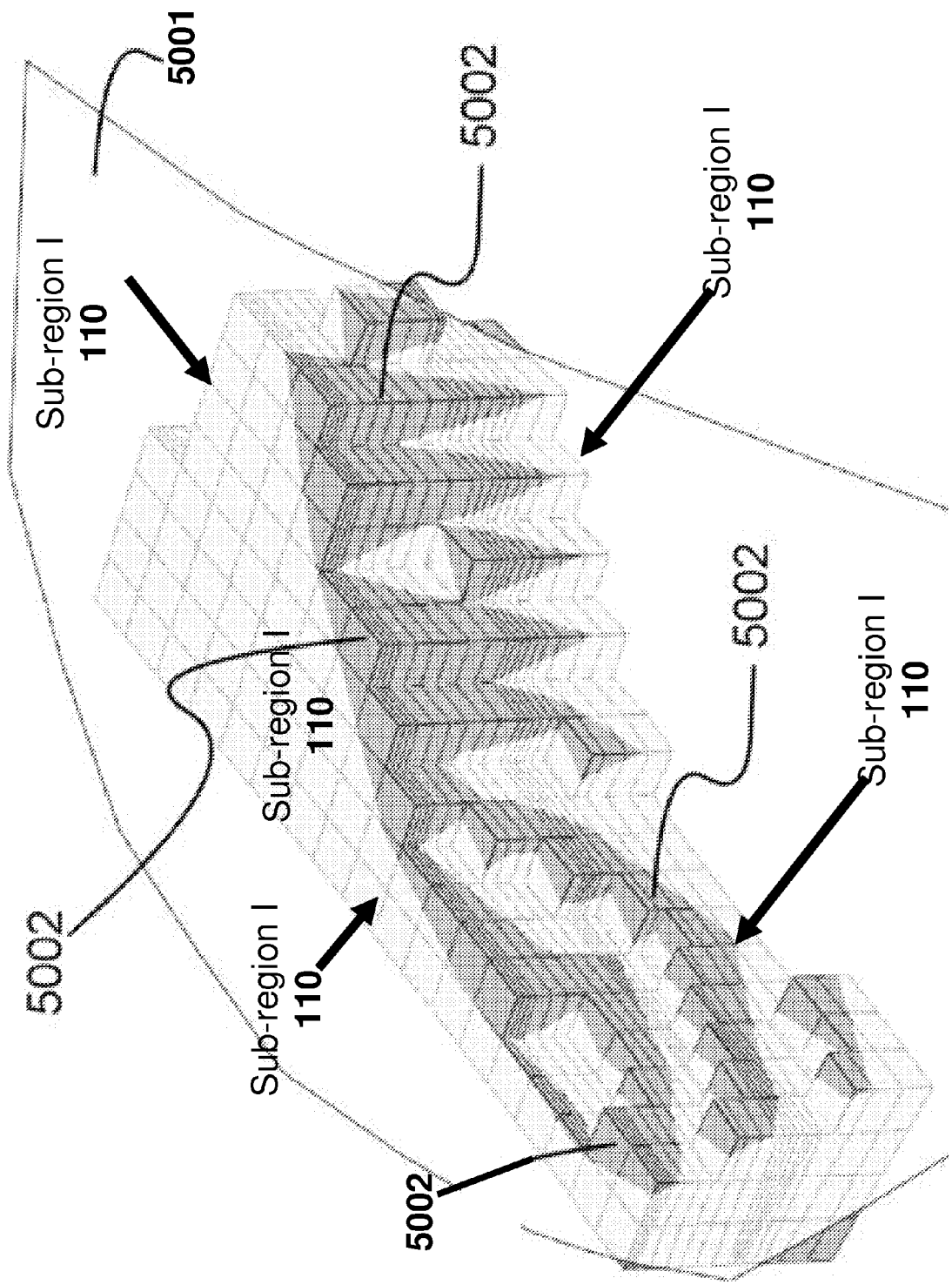

In some embodiments, for example related to situations where a dual-cookie cutter routine is employed in FIG. 10, border cells CELL_SR$_i^j$ may include cells that are intersected by and divided by a geological discontinuity—see, for example, the cells marked with an "X" in FIG. 3D.

In yet another use case, the input SGrid may include a stair-step representation of one or more 'dying faults' that are 'internal within a single geological region.' In this use case, it is possible to modify move vertices (i.e. see below with reference to steps S115-S119) according to a 'dying fault' or an 'internal geological discontinuity' that resides entirely within a single 'sub-region.' In this case, the cells which will be selected in step S115 may include cells within the single sub-region that are internally divided by a dying fault.

In step S115, cells (and/or vertices thereof) that are 'local' to the geological discontinuity are identified (for example, by classifying cells and/or vertices). One example of a cell that is 'local' to the geological discontinuity is a 'border cell' between sub-regions—i.e. a cell at least one facet of which defines the border between sub-regions that are divided from each other according to a geological discontinuity surface (for example, see the cells marked with an "X" or with a "Y" of FIG. 3D. One example of a cell that is 'local' to the geological discontinuity is a cell that is "split" or intersected by the geological discontinuity or a cell which borders an 'intersected cell' (for example see the cells of FIG. 3D that are marked with an "X").

One exemplary vertex classifying or identifying or selecting technique (i.e. for step S115 of FIG. 10) is discussed below with reference to FIG. 11.

In step S119 of FIG. 10, for vertices of at least some of the cells (for example, one or more vertices of border cells CELL_SR$_i^j$ where i and j are positive integers) are respectively moved by certain distance in a certain direction (i.e. characterizing a 'vertex moving vector'). This distance and direction of the vertex moving may be determined according to a (i) geometric relation between the vertex and/or a local cell lc of which the vertex is a member and (ii) one or more geometric features of a geological discontinuities that are local to lc or vertex V which is moved in step S119. In one non-limiting example, each vertex is moved according to a different respective 'movement vector' in a manner to transform cells (e.g. border cells) so that the 'stair-stepped' approximation of the fault of an input SGrid is smoothed—for example, as illustrated in various figures.

As will be discussed with reference to FIGS. 12-14, in some embodiments, it is possible to move vertices in step S119 in a manner which results in the "smoothing" of a "stair-step" approximation (for example, in a direction substantially parallel to a reference horizon) of geological discontinuity. For example, by projecting in an appropriate direction (e.g. by substantially constraining movement of the vertex within the plane of the upper/top or lower/bottom facet of the cell to be transformed—this plane is the local plane of the reference horizon), it is possible to achieve this result.

Thus, in some embodiments, the distance and/or direction by which a particular vertex is moved depend on a distance between the vertex and the local geological discontinuity (e.g. fault). In one example, this distance may be a simple Euclidian distance. In one preferred embodiment (and as will be discussed below with reference to FIGS. 12-14), this distance may be computed such that displacements between the geological discontinuity and "the vertex to be moved" within the local plane of the reference horizon are assigned greater 'importance' or greater weight. Thus, in this example, the "vertical" displacements (not necessarily truly vertical—rather perpendicular to the local plane of the reference horizon) between the "vertex to be moved" would be assigned less weight and the distance and direction that the "vertex to be moved" is actually moved is computed according to this "biased" distance metric.

In another preferred embodiment, these "vertical displacements" are substantially ignored and/or assigned substantially no weight, and the "distance metric" is computed primarily and/or only according to the 'horizontal displacements' (not necessarily truly vertical—rather tangent to the local plane of the reference horizon which is coplanar with the bottom or top facet of the 'host cell' of the 'vertex to be moved').

It is noted there is no requirement for the distance between the 'vertex to be moved' and the 'geological discontinuity' to be computed explicitly. In some embodiments, a 'target location' to where the 'vertex to be moved' is moved may be computed according to a formula (or iteratively or in any other manner) that is indicative of (and/or derived from) this distance.

FIG. 10B is a technique for resolving intermediate grids. Steps S311 and S315 are the same as in FIG. 5A. However, step S319 which generates a non-contradictory stair-stepped grid that does not require overlapping cells has been replaced with step S329 which may be implemented using the technique of FIG. 10A. It is possible to 'resolve' the two 'contradictory intermediate grids' in a manner that does not eliminate cells and/or vertices. Thus, in some example, the grid provided by resolving 'contradictory grids' according to step S329 may provide an SGrid with a different number of cells than by resolving 'contradictory grids' according to S319 which may eliminate cells and/or vertices. This issues is further discussed below with reference to FIG. 15.

Figure 11:
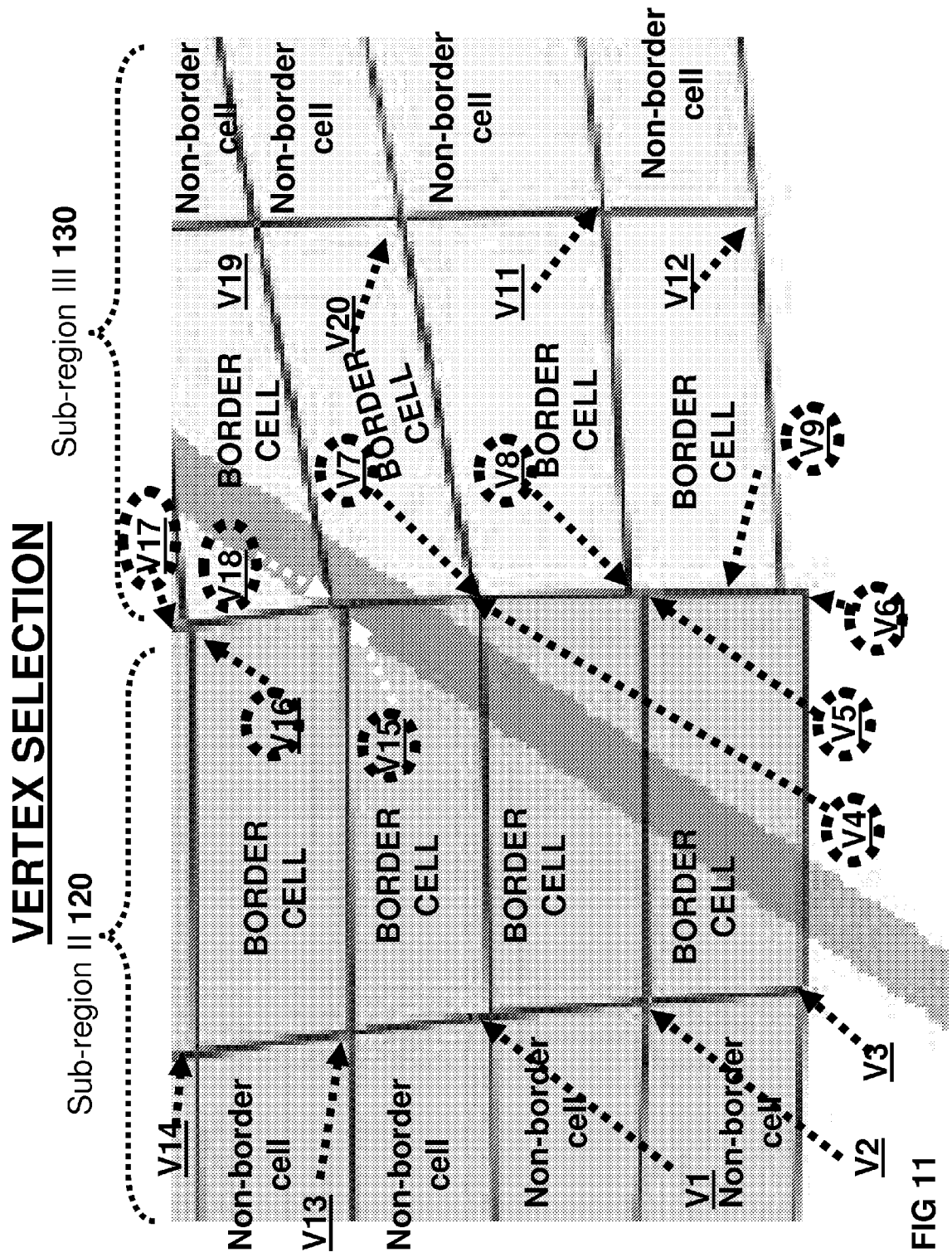
FIG. 11 illustrates vertex selection.

Discussion of FIG. 11—Vertex Selection

In some embodiments, as mentioned above with reference to step S115 of FIG. 10, 'target vertices' to be moved are identified. In one example related to FIG. 11, the vertex movement of step S119 is carried out preferentially and/or selectively to one or more 'target' vertices of cells near or 'local to' a geological discontinuity. For example, some sort of 'distance threshold' may be established where 'distance' may be measured according to a number of cells or in any other manner (for example, 'classical Euclidian distance' and/or distance within the local plane of the reference horizon.

In one example, the vertex movement of step S119 is carried out preferentially and/or selectively to 'target' vertices of cells that are internally divided by a fault or cells adjacent to a cell internally divided by a fault (or other geological discontinuity). In one example, the vertex movement of step S119 is carried out preferentially and/or selectively to target vertices of 'border cells' of a sub-region region (referred to above as cells of CELL_SR$_i^j$ for border cells within sub-region i that border sub-region j) as opposed to non-border cells. For the particular case of the 'dual cookie cutter' (i.e. for the case of a geological discontinuity that divides between sub-regions) these border cells may be the set of cells that are either (i) internally divided by a geological discontinuity; and/or (ii) adjacent to (but in another sub-region) those cells internally divided by the geological discontinuity.

In yet another example, vertices of cells that are internally divided by a 'dying fault' are selected as 'target vertices.'

Furthermore, in some embodiments, the vertex movement of S119 is carried out preferentially and/or selectively to specific vertices of a 'selected' or 'preferred' cell—for example, 'local' cells local to the geological discontinuity such as border cells or cells internally divided by the geological discontinuity.

In one example illustrated in FIG. 11, the vertex movement of S119 is carried out preferentially and/or selectively to vertices of border cells which are part of facets (e.g. lateral facets) that substantially touch or 'borders' a different sub-region. Thus, in the example of FIG. 11, the vertices V5 and V6 are part of a lateral facet (i.e. along with two additional vertices) within sub-region II that borders sub-region III 130 (in particular, that borders the lateral facet that includes V8 and V9 and two additional vertices). Thus, vertices V5-V6 and V8-V9 are referred to as 'border vertices.' In contrast, while vertices V2 and V3 are vertices of a 'border cell,' they belong (with two additional vertices) to a facet which is internal to the sub-region II-120 and is not separating two distinct sub-regions.

In FIG. 11, the 'border vertices' are V4-V9, V15-V18 and V16-V17—the 'border vertices' are circled.

Figure 12A:
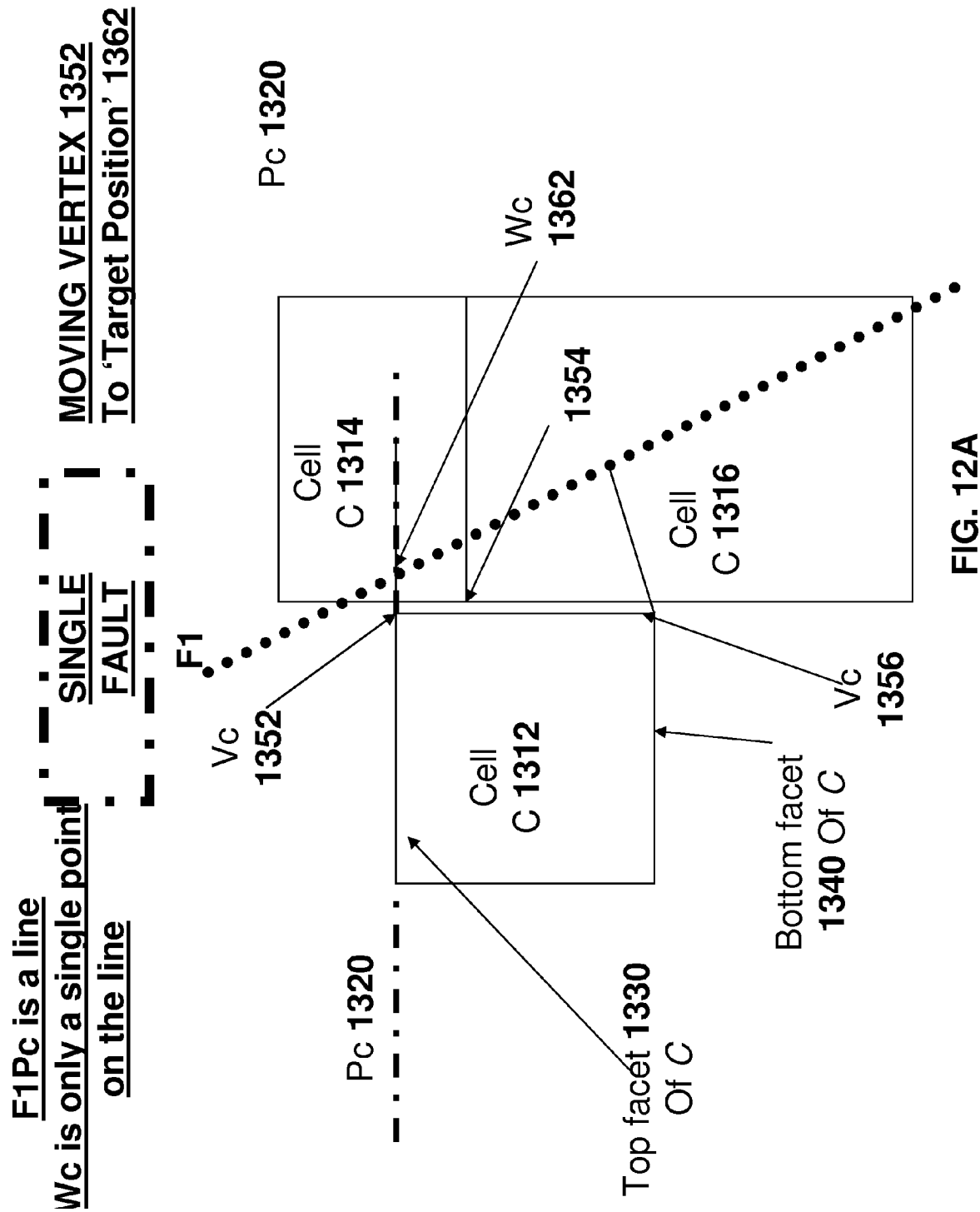
FIGS. 12-14 illustrate techniques for moving a target vertex.
Figure 12B:
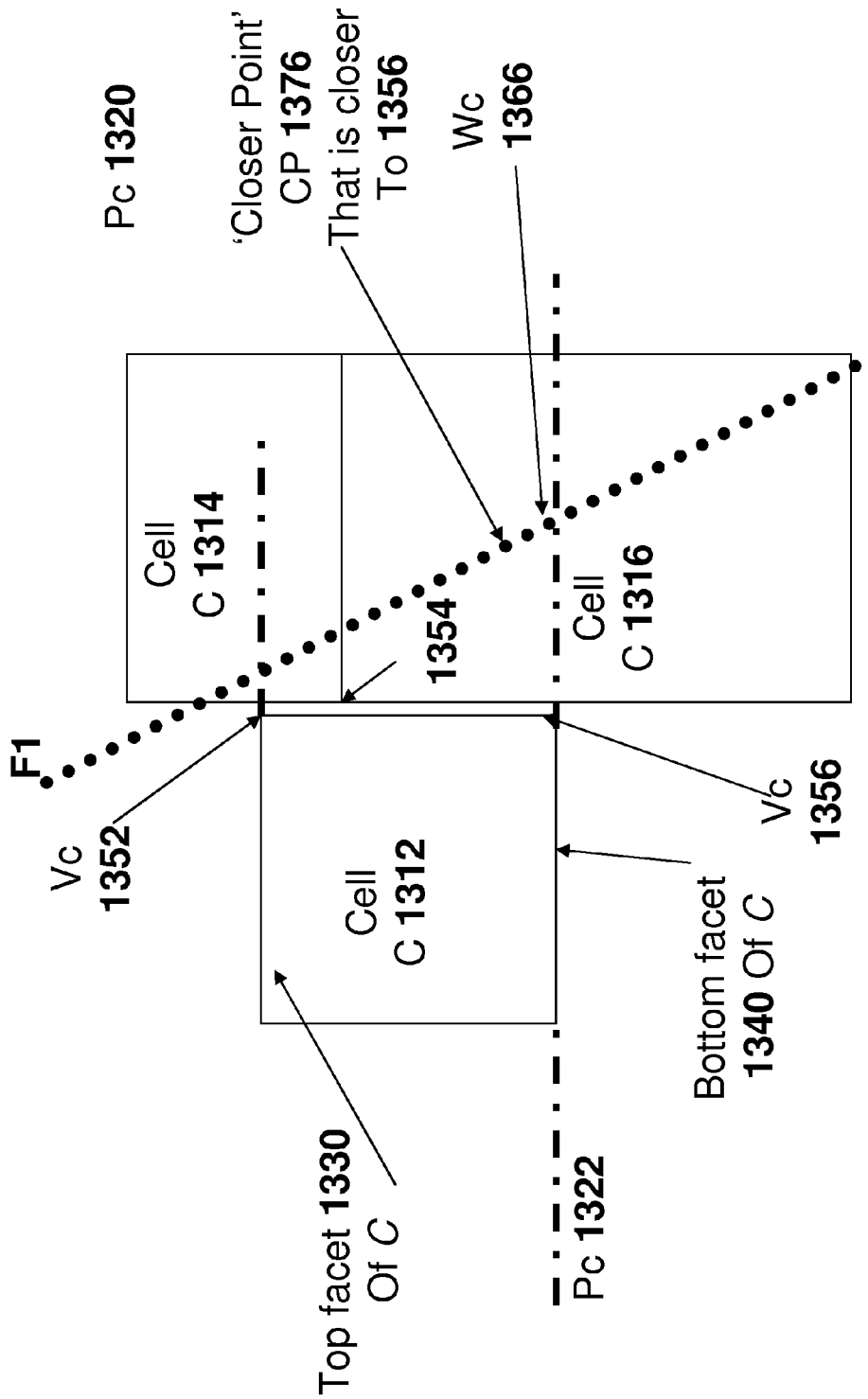
Figure 12C:
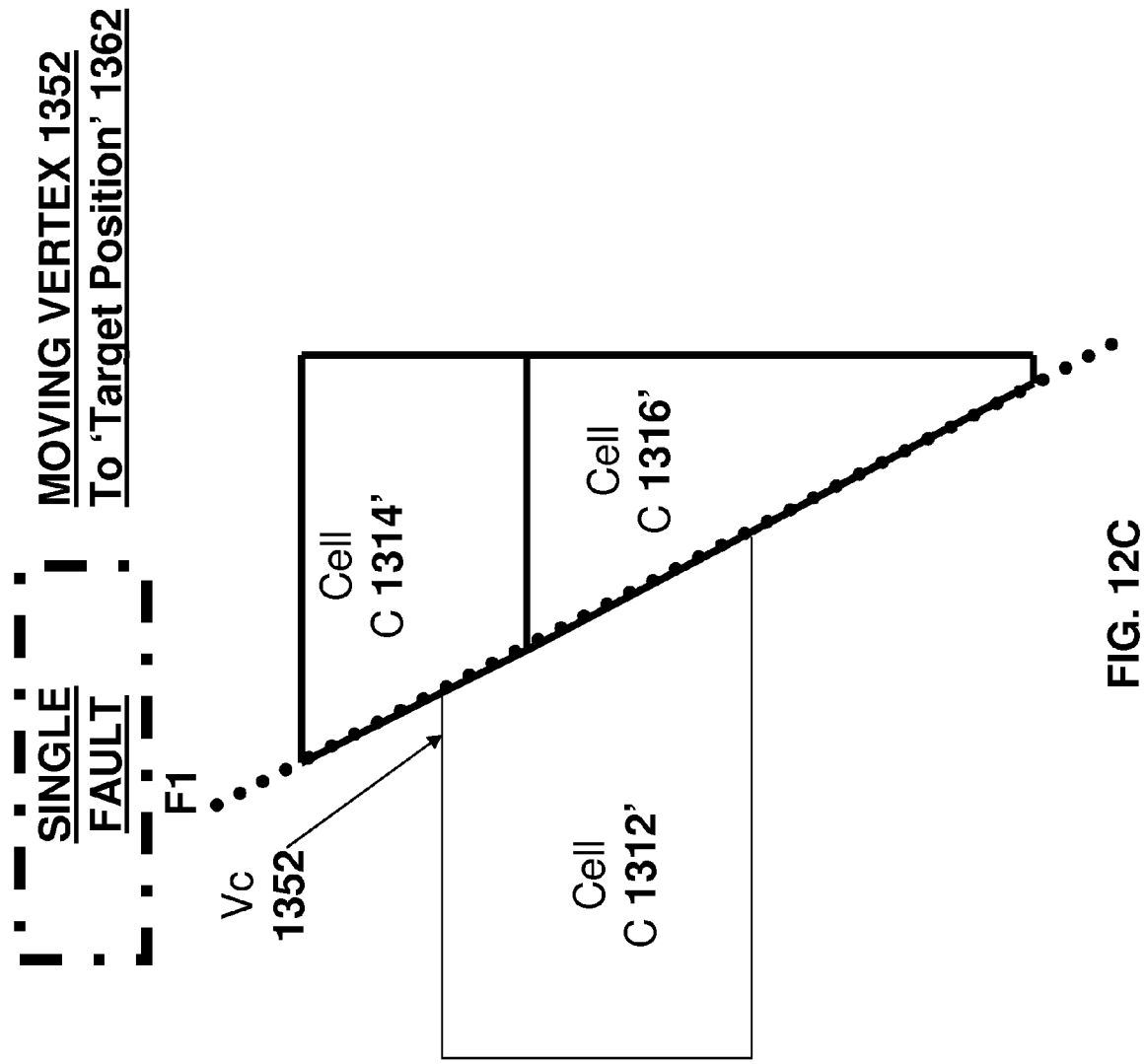
Figure 13:
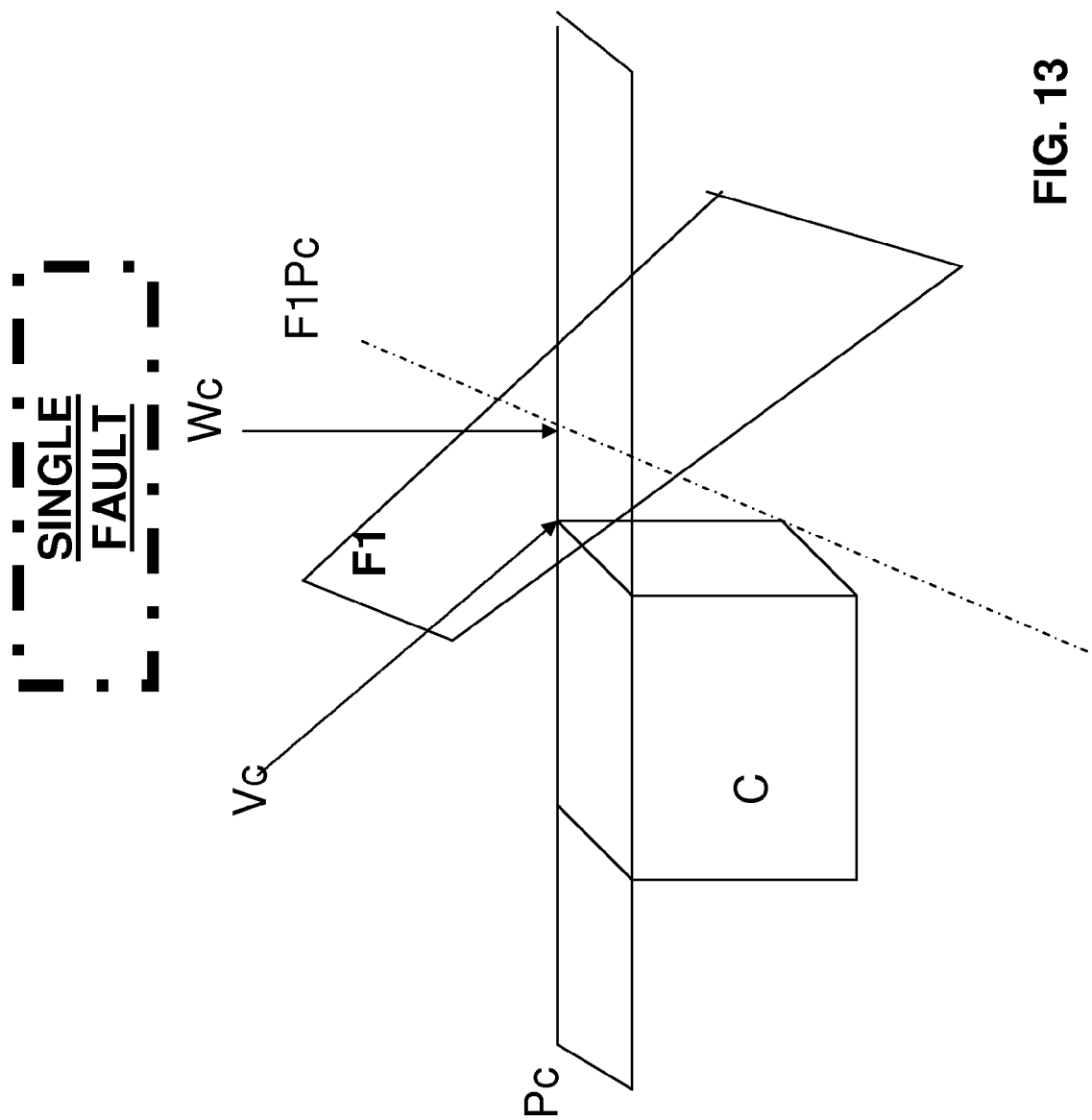
Figure 14A:
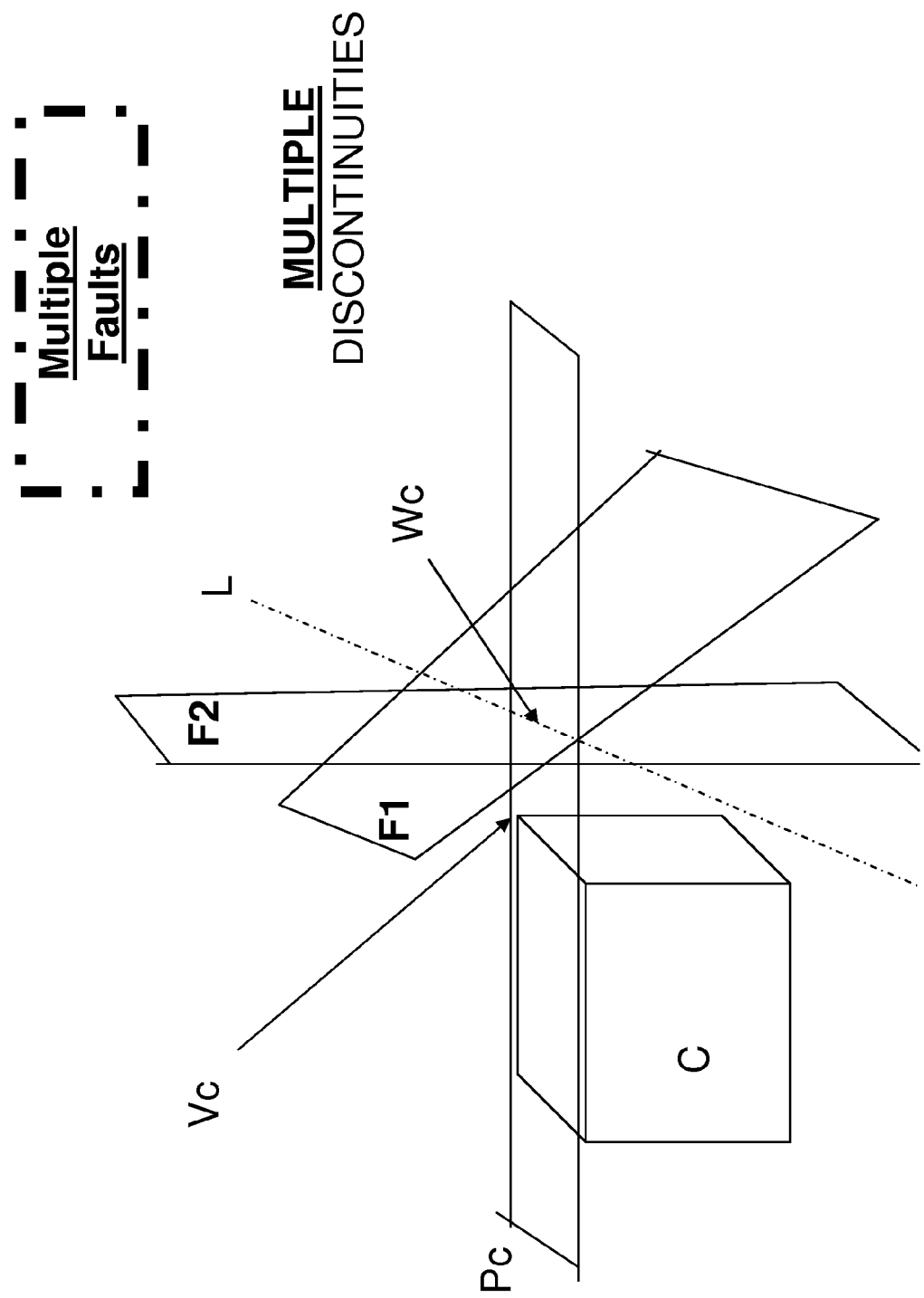
Figure 14B:
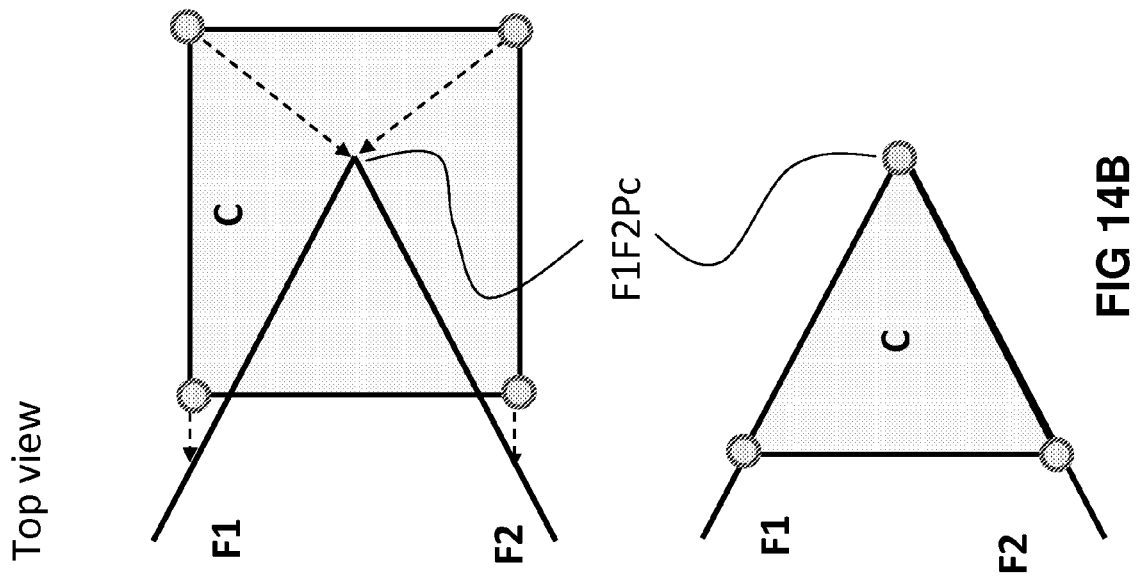

Discussion of FIG. 12-14—An Exemplary Technique for Determining a Distance and/or Direction to Move a Vertex As noted above, in some embodiments, it is possible to move vertices in step S119 in a manner which results in the "smoothing" of a "stair-step" approximation (for example, in a direction substantially tangential to a reference horizon) of geological discontinuity. For example, by projecting in an appropriate direction (e.g. by substantially constraining movement of the vertex within the plane approximating the upper/top or lower/bottom facet of the cell to be transformed—this plane is the local plane of the reference horizon), it is possible to achieve this result.

For the present disclosure, the terms 'upper facet' and 'top facet' are used synonymously. For the present disclosure, the terms 'bottom facet' and 'lower facet' are used synonymously FIG. 12A is a vertical cross section which illustrates one example of projecting a 'target' vertex 1352 onto a single fault F1—the dotted line illustrates in 2D the intersection between the fault and a vertical plane. In FIG. 12A, vertex Vc 1352 is projected to point Wc 1362. In the example of FIGS. 12A, cell C 1312 (of which vertex Vc 1352 is a part) is in 'sub-region A' and borders cells 1314 (within sub-region B) and 1316 (within sub-region B). The latter two cells are intersected by and divided by fault F1.

In FIG. 12A, the 'target point' Wc 1362 to which vertex 1352 is moved may be computed by moving vertex 1352 within the plane 1320 of the top facet 1330 of cell 1312.

In FIG. 12B, the 'target point' Wc 1366 to which 'target' vertex 1356 is moved may be computed by moving vertex 1356 within the plane 1322 of the bottom facet 1340 of cell 1312.

As illustrated in FIG. 12B, in one example, the 'closest location' on the surface of geological discontinuity F1 to the 'target point' to be moved 1356 is 'closer point' 1376 which happens to be closer to 'target point' 1356 than Wc 1366 (the 'new location' of Vc after it is moved from 1356. Thus, although target vertex 1356 may be moved to some sort of 'closest location' on F1, this location may be the closest according to a distance metric which deemphasizes (i.e. either partially or completely") 'vertical distances' in the direction normal to the local reference horizon and/or to the top or bottom facet of the 'target cell' hosting the 'target vertex' 1356. In some embodiments, this distance metric may provide different results than the 'traditional Euclidian distance.'

Thus, although CP 1376 is closer to Vc 1356 according to the 'traditional Euclidian distance,' location Wc 1366 is 'closer' to Vc 1356 according to the desired distance metric which deemphasizes the aforementioned 'vertical distances.' For some limited cases, the two distance metrics may produce identical results—for example, for cases where the fault F1 is orthogonal to the reference horizon. However, other cases (e.g. where an angle between a local plane of fault F1 deviates from the normal plane that is orthogonal to the top or bottom facet of the 'target cell' by a value that is at least 5 degrees, or at least 10 degrees, or at least 20 degrees, or at least 30 degrees, or at least 40 degrees), a ratio between: (i) a 'Euclidian' distance between the closest point 1376 and the target vertex 1356 according to the Euclidian distance metric and (ii) a distance according to the 'preferred distance metric' between the point Wc 1366 and the target vertex 1356 may be: (i) at least 1.01 and/or at least 1.05 at least 1.1, and/or at least 1.2 and/or at least 1.3 and/or at least 1.5 and/or (ii) at most 2 and/or at most 1.5 and/or at most 1.3 and/or at most 1.2 and/or at most 1.1 and/or at most 1.05 and/or at most 1.02.

During the 'smoothing' or 'moving process' other 'target' vertices may be moved—for example, vertices 1354 and other vertices (NOT SHOWN).

As illustrated in FIG. 12C, after the 'smoothing' or 'moving process' is carried out, cell 1312 (now 1312') increases in size at the expense of cells 1314 and 1316. Although not a requirement, in the example of FIG. 12, a process has been carried out which transforms cells 1314 and 1316 from cells which are divided/intersected by a geological discontinuity F1 into cells which are no longer divided/intersected by a geological discontinuity. In some embodiments, this may be achieved while preserving the property that lateral facets of cells 1314 and 1316 maintain their quadrilateral shape topology. (see 6002A and 6002B of FIG. 9B)—thus, one salient feature of the stair-step approximation in the 'substantially vertical' direction perpendicular to the reference-horizon may be maintained without losing an advantage of 'stair-step' approximations of geological discontinuities. Furthermore, it is now possible to provide an SGrid which avoids the situation where the individual cells are 'divided' by the fault, while avoiding the irregular cell shapes that may be generated by other SGrid routines (e.g. the 'Primal Cookie-Cutter').

In one non-limiting embodiment, the following routine may be carried out: For each cell C with at least one vertex belonging to a stair-step approximation of at least one fault, as an example but not limited to, the general principle of the proposed smoothing algorithm can be implemented as follows:

1. For each vertex Vc of the cell C such that Vc is 'local to' the geological discontinuity (for example, a 'border' vertex and/or located on a stair-step and/or located in a cell intersected by the geological discontinuity):
   a. Look for the set of set of smooth faults F={F1, F2, ..., Fn} approximated by the stair-step facets of C to which Vc is belonging.
   b. Build the plane Pc tangent to the top or bottom facet of C passing by Vc (Pc may be coplanar to a local planar approximation of a reference horizon),
   c. If the set F contains only one fault F1, then
      i. Look for the intersection F1Pc of F1 with the plane Pc,
      ii. Look for the point Wc located on F1Pc which is the closest from Vc,
      iii. Move Vc to Wc
   d. Otherwise, if the set F contains two faults F1 and F2, then
      i. Look for the line L corresponding to the intersection of F1 and F2,
      ii. Look for the intersection LPc of L with the plane Pc,
      iii. Look for the point Wc located on LPc which is the closest from Vc,
      iv. Move Vc to Wc
   e. Otherwise, if the set F contains three faults F1, F2 and F3, then
      i. Look for the point Wc corresponding to the intersection of F1, F2 and F3,
      ii. Move Vc to Wc
2. Stop One example of this algorithm is illustrated in FIG. 13 for the case of a "single fault." Another example of this algorithm is illustrated in FIG. 14 for the case of two faults F1 and F2. In both figures, "C" is the cell to be transformed, Vc is the vertex to be moved, Pc is the plane of the top or bottom facet (in this case the bottom facet). In FIG. 14, the 'target location' Wc for vertex Vc (i.e. a vertex to be moved) is shown for the situation of multiple geological discontinuities In some embodiments, the moving of vertices of transform cells of an SGrid may even 'reduce the quality' of the shape of the transformed cell—for example, by transforming angles (i.e. between facets of a cell) that are substantially right angles into angles that are 'sharp angles' and that deviate from 90 degrees by at least 45 degrees or at least 70 degrees or at least 80 degrees. In some embodiments, the transforming of vertices of an SGrid may increase or decrease the size of a cell—for example, by at least 10% or least 30% or at least 50% or at least 70% or (for increasing) at least 100% or at least 200%.

In some embodiments, the moving of vertices may transform two facets of a single cell which before the moving of vertices had substantially the same area (e.g. within a tolerance of 50% or 30% or 10%) and which after the moving of the vertices have quite different areas (for example, the area ratio between the facet with the larger area and the facet with the smaller area is as least 1.5:1 or at least 2:1 or at least 3:1 or at least 4:1). This may significantly cause a 'deformation of the shape of the cell'—nevertheless, in some embodiments, because the movement of the vertices is substantially in the plane of the top and bottom facets, the 'quadrilateral' shape of lateral facets may even be preserved in these situations.

FIGS. 12-14 related to the non-limiting example of a 'linear' or planar geological discontinuity—it is appreciated that this is not a limitation. Furthermore, the example FIGS. 12-14 related to the case where a cell that is intersected by and/or divided by a fault is transformed into a cell that is not intersected by and/or divided by a fault. This is not a limitation—in yet another example, the 'intersecting fault' is brought from an interior of a cell much closer to a cell facet.

Figure 15:
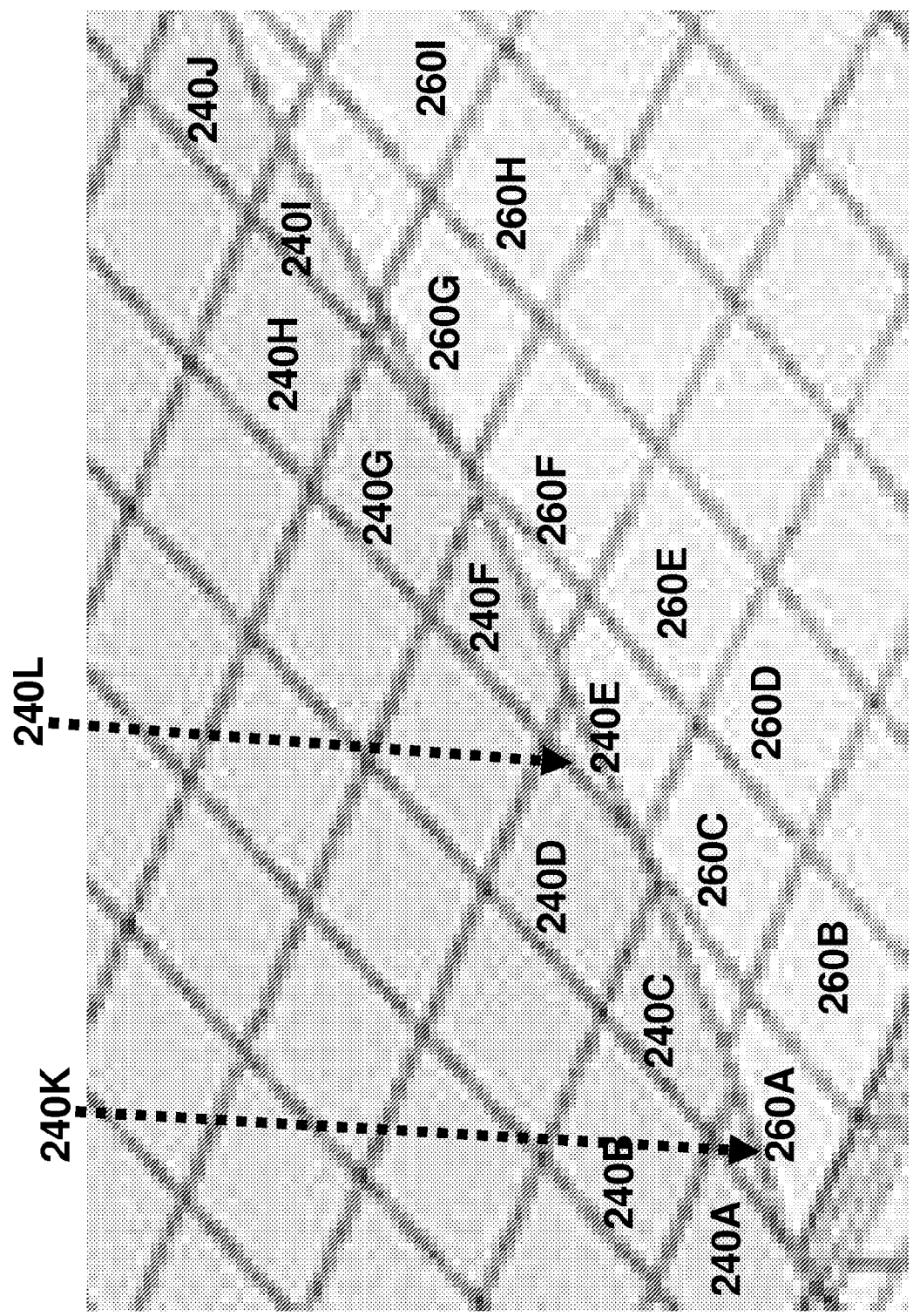
Figure 16:
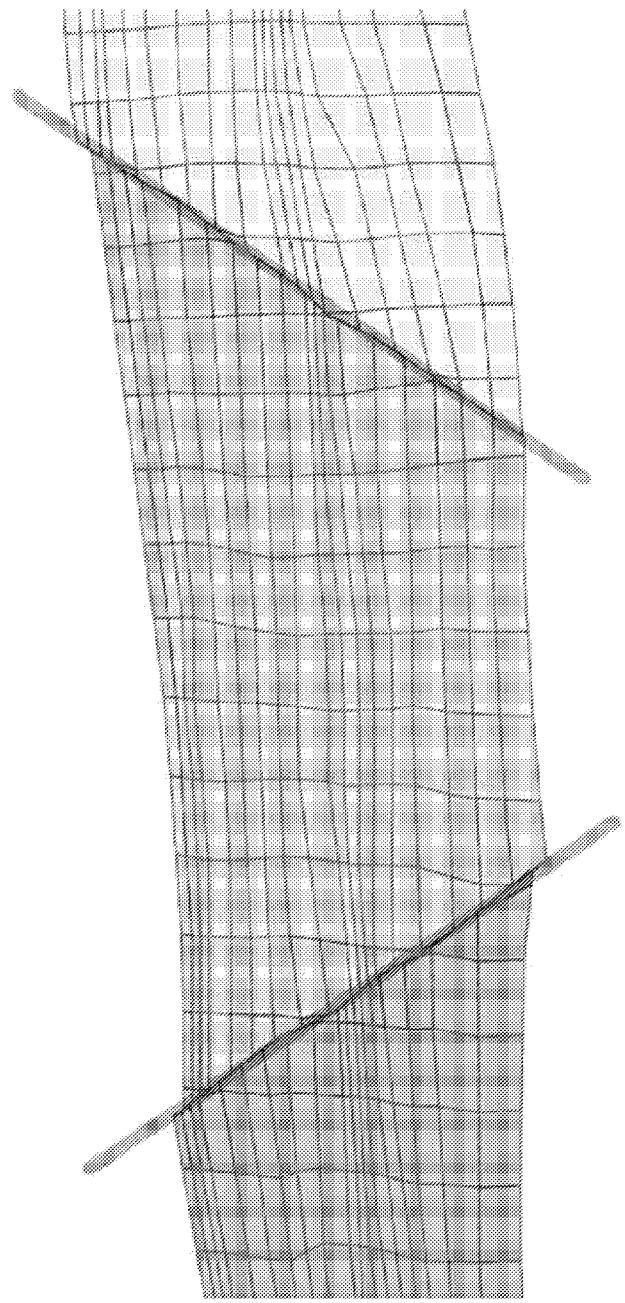

Brief Discussion of FIG. 15

FIG. 15 illustrates, according to one non-limiting example, an example of a 'transformed' SGrid. In one example, the grids of FIG. 15 may be obtained by applying the grid transformation technique of FIG. 10 to a self-contradictory SGrid and/or a grid with overlapping cells. This grid may be 'resolved' using a vertex moving and/or 'smoothing technique (for example, see FIG. 10).

Figure 6A:
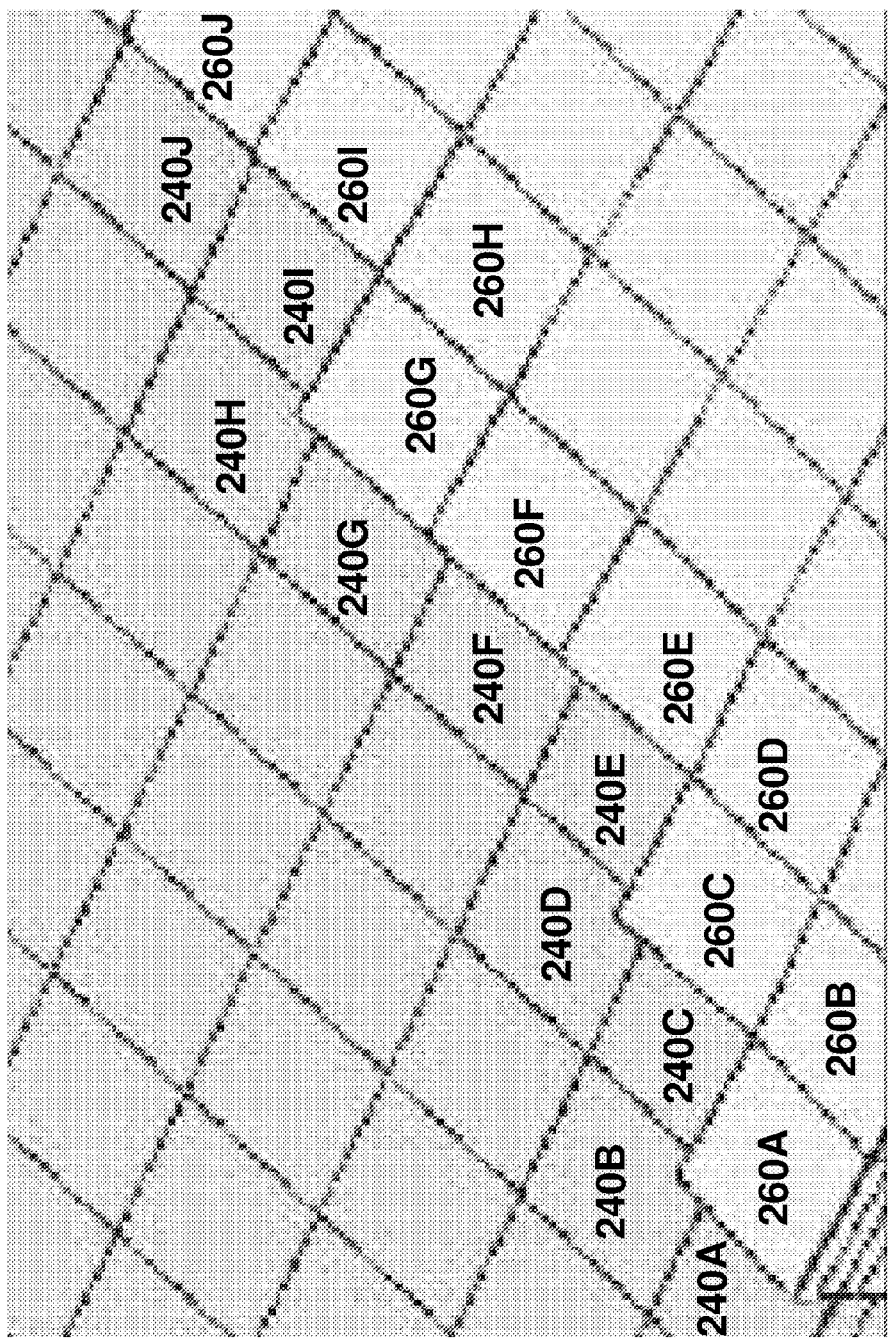
Figure 6B:
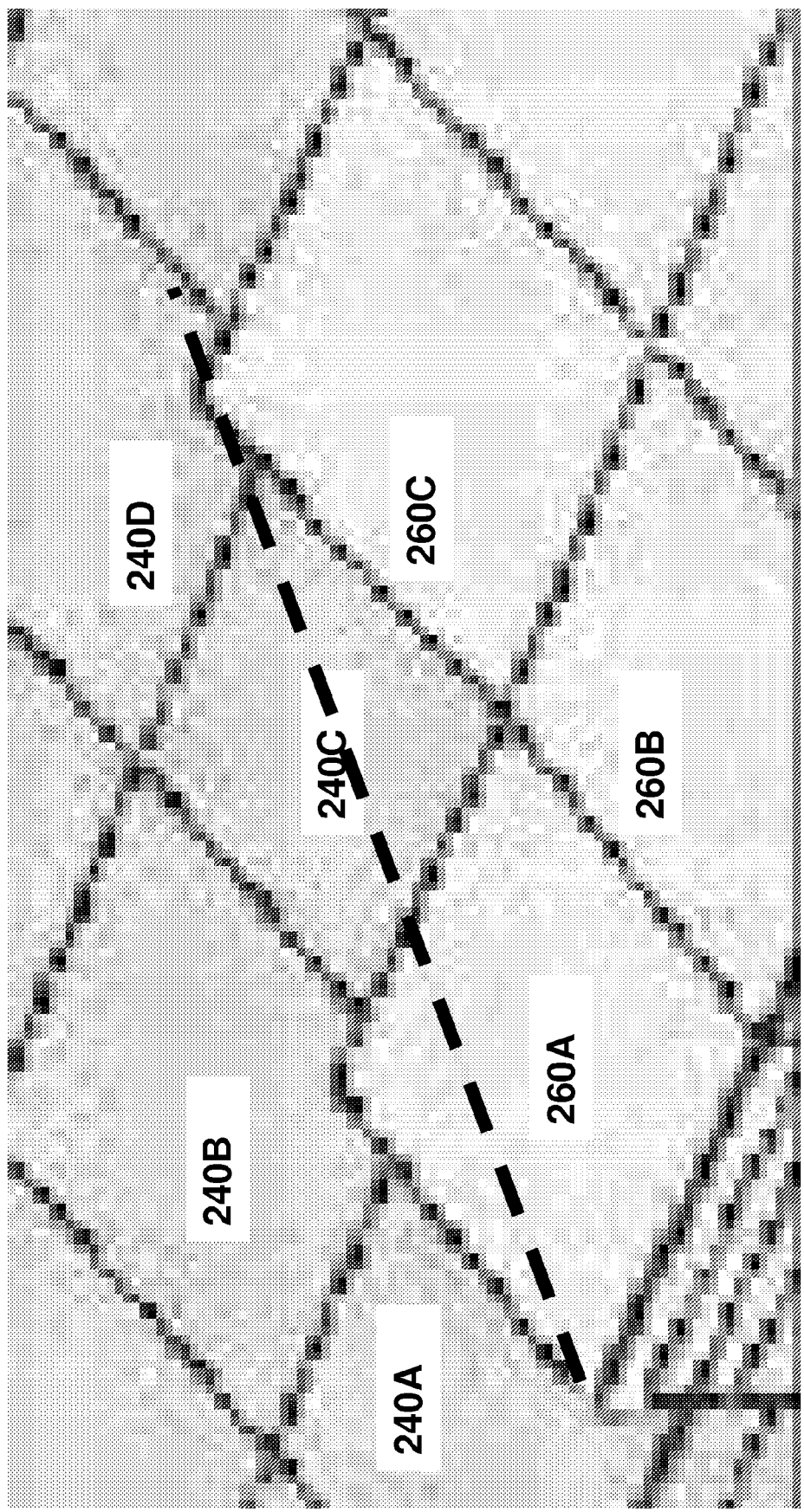

By comparing FIG. 15 to FIGS. 6A-6B, it is possible to see that: the 'stair-step' representation has been replaced with a 'smoother' representation. Cells 260A and 240C are no longer split by the fault. In addition, the SGrid of FIG. 15 may include additional cells—for example, due to the fact that according to one implementation, step S319 removes cells and/or vertices while step S329 does not.

Discussion of FIGS. 17-20: Cell Merging

In some embodiments, one or more cells may be transformed by the 'vertex-moving' technique (for example, to smooth the representation of a fault) so that these cells have one or more properties of degenerated cells. These 'degenerate-like cells' (referred to as slivers) may have small or null volumes and/or sharp angles.

In some embodiments, 'degenerate-like' cells may be characterized by small or even null volumes. In one example, a size ratio between one of these tiny degenerate cells and the largest adjacent cell neighboring this degenerate-like cell may be at most 1:2 or at most 1:3 or at most 1:5. In one example, a size ratio between one of these tiny degenerate cells and cell of average size among the adjacent cells adjacent to the 'tiny' cell may be at most 1:2 or at most 1:3 or at most 1:5.

In some embodiments, at least one facet of a degenerate-like cell (or sliver) may include at least one angle that is sharp—for example, having a value less than 20 degrees or less than 10 degrees or less than 5 degrees.

Figure 17:
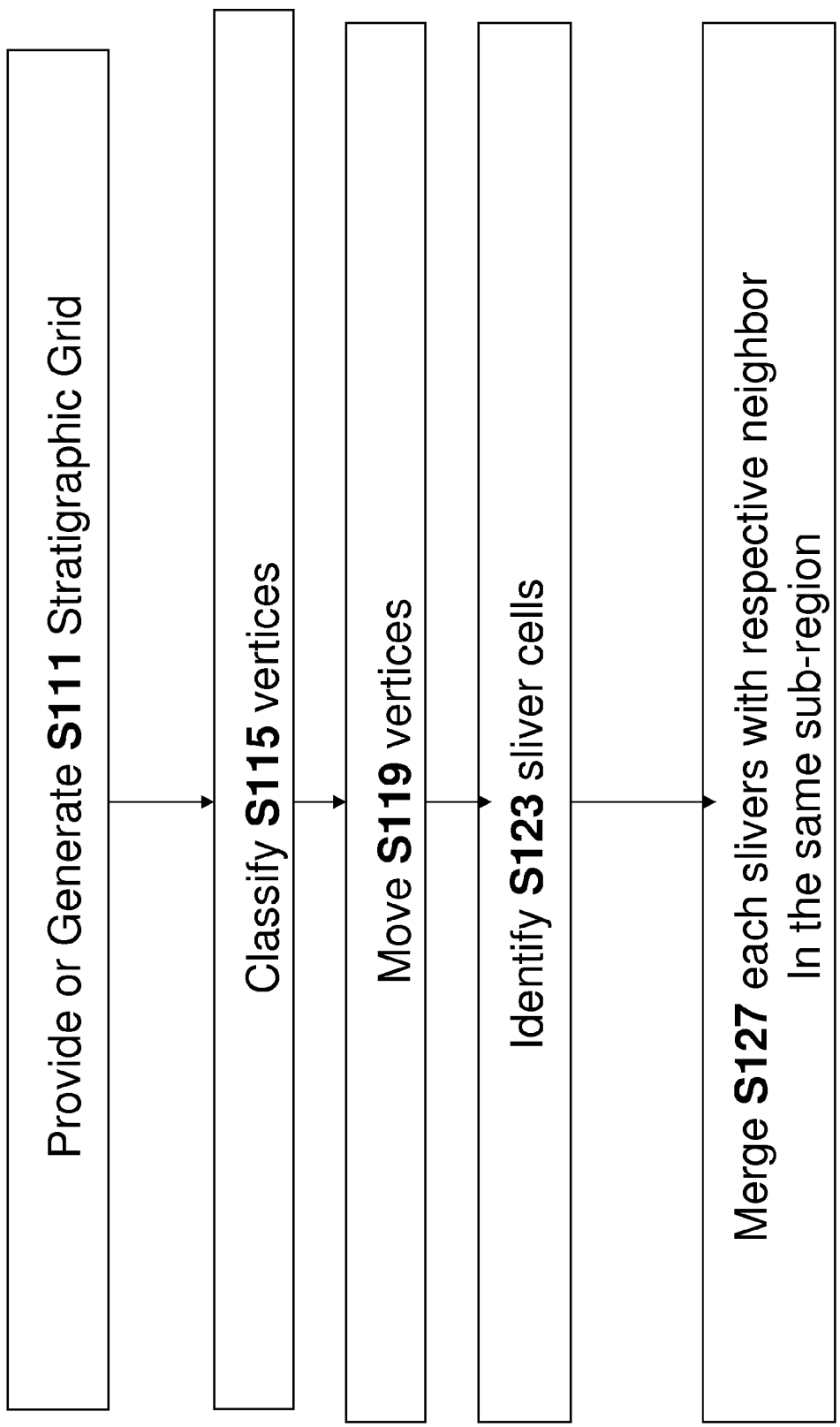
FIGS. 17-20 relate to a routine for merging cells.

FIG. 17 is a flow chart of an SGrid transformation routine that includes an additional 2 steps. In step S123, the sliver cells formed by the vertex moving of step S119 are identified (for example, by classifying cells). In step S127, at least some of the slivers are merged with a neighbor within the same 'sub-region' (e.g. without merging 'across a geological discontinuity).

Figure 18:
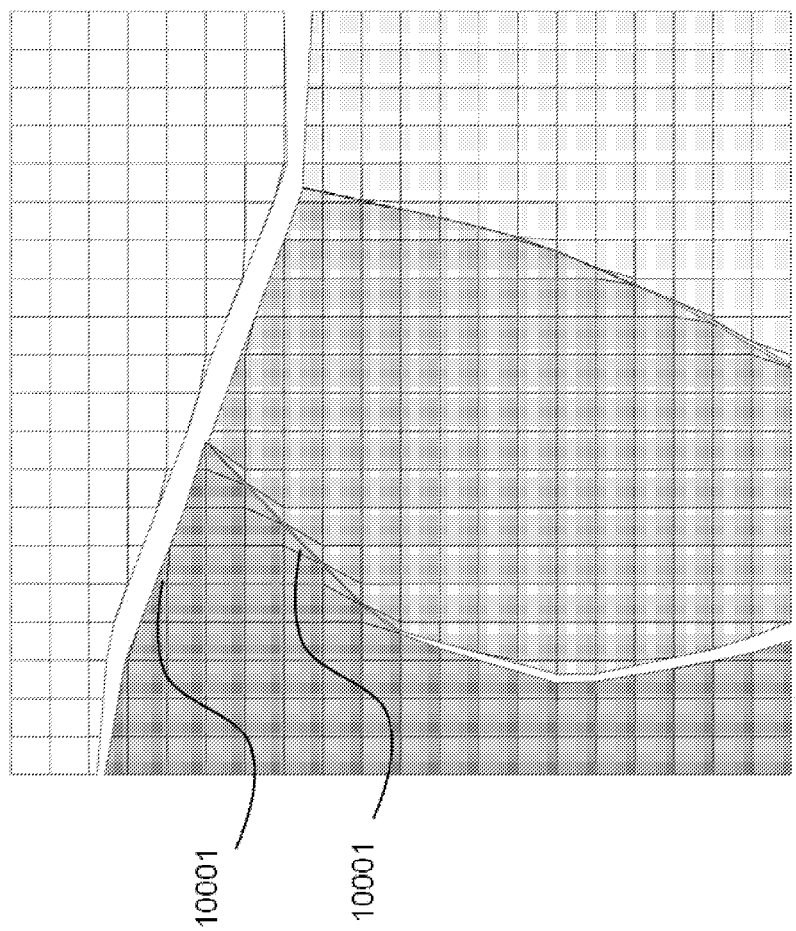
Figure 19:
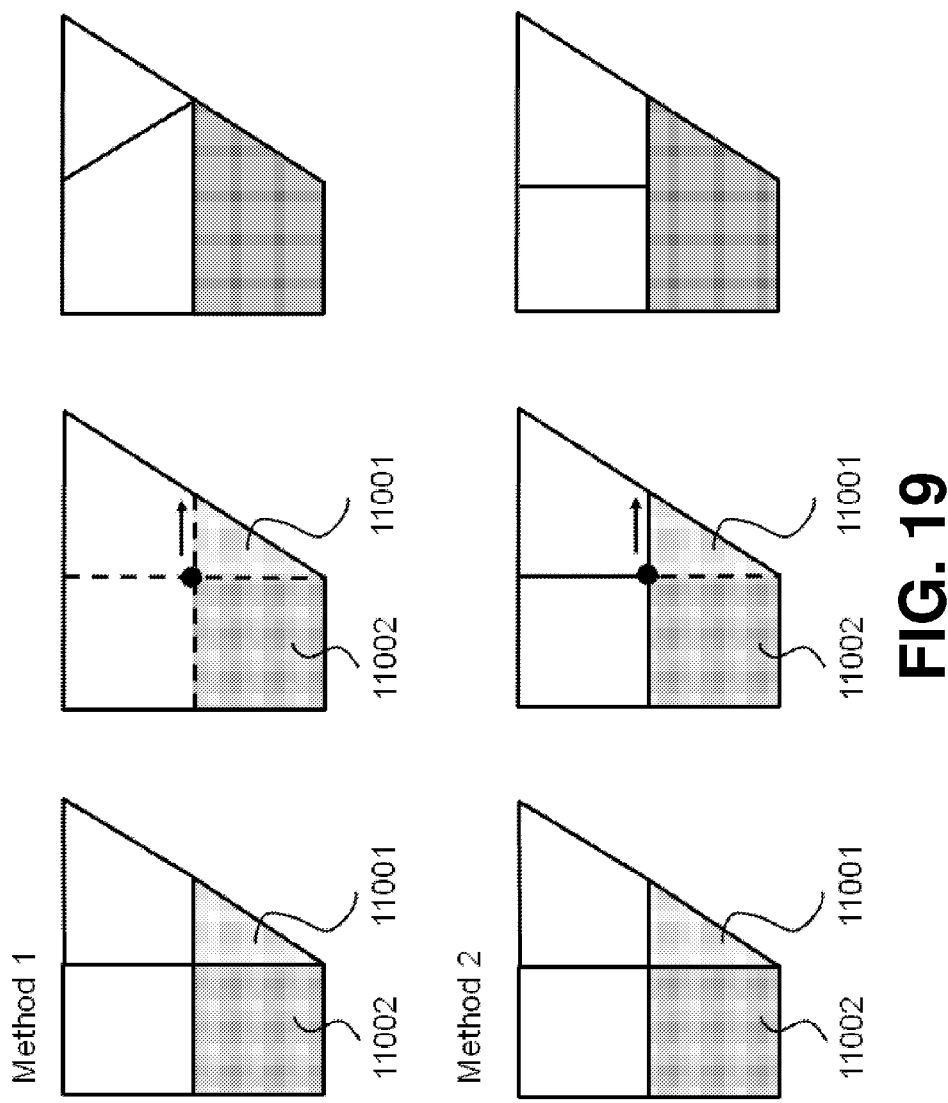
Figure 20:
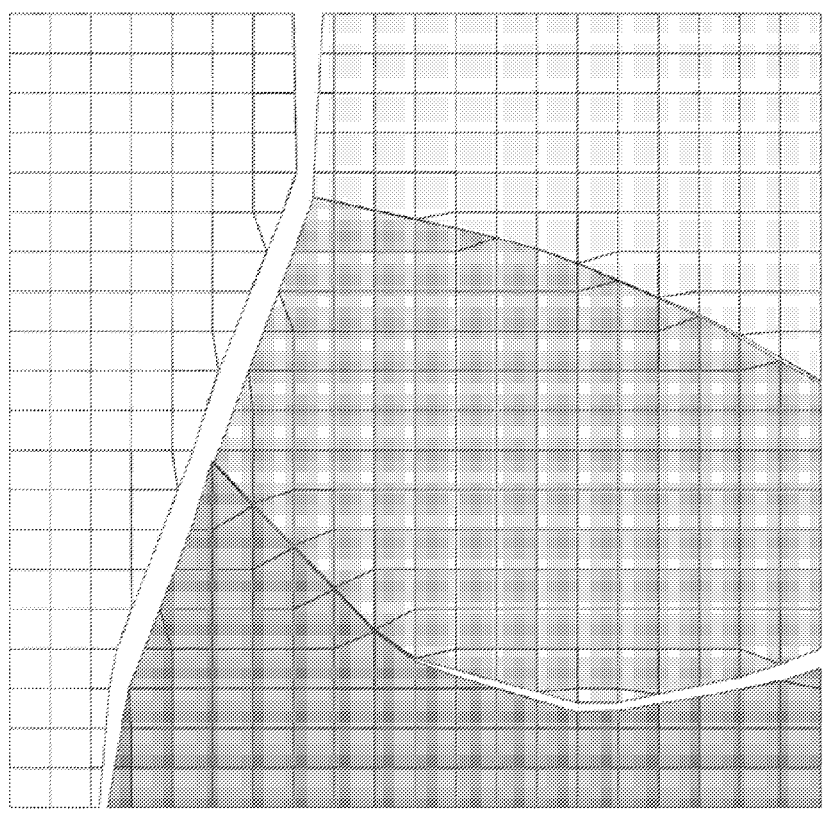

In some embodiments, the following routine may be employed:
1. For each cell C that has been smoothed:
    a. If cell C is identified as a sliver cell and has a cell N in its immediate neighbourhood that is not located in the stair-step, then
        i. Merge C to N using one of the two methods depicted in FIG. 19 (C and N are represented as 11001 and 11002 respectively)
2. Stop In one non-limiting example, FIG. 18 is a top view of an SGrid after step S119 but before step S127. FIG. 20 is a top view of an SGrid after the merging of slivers of step S127.

Discussion about a Computer

Figure 21:
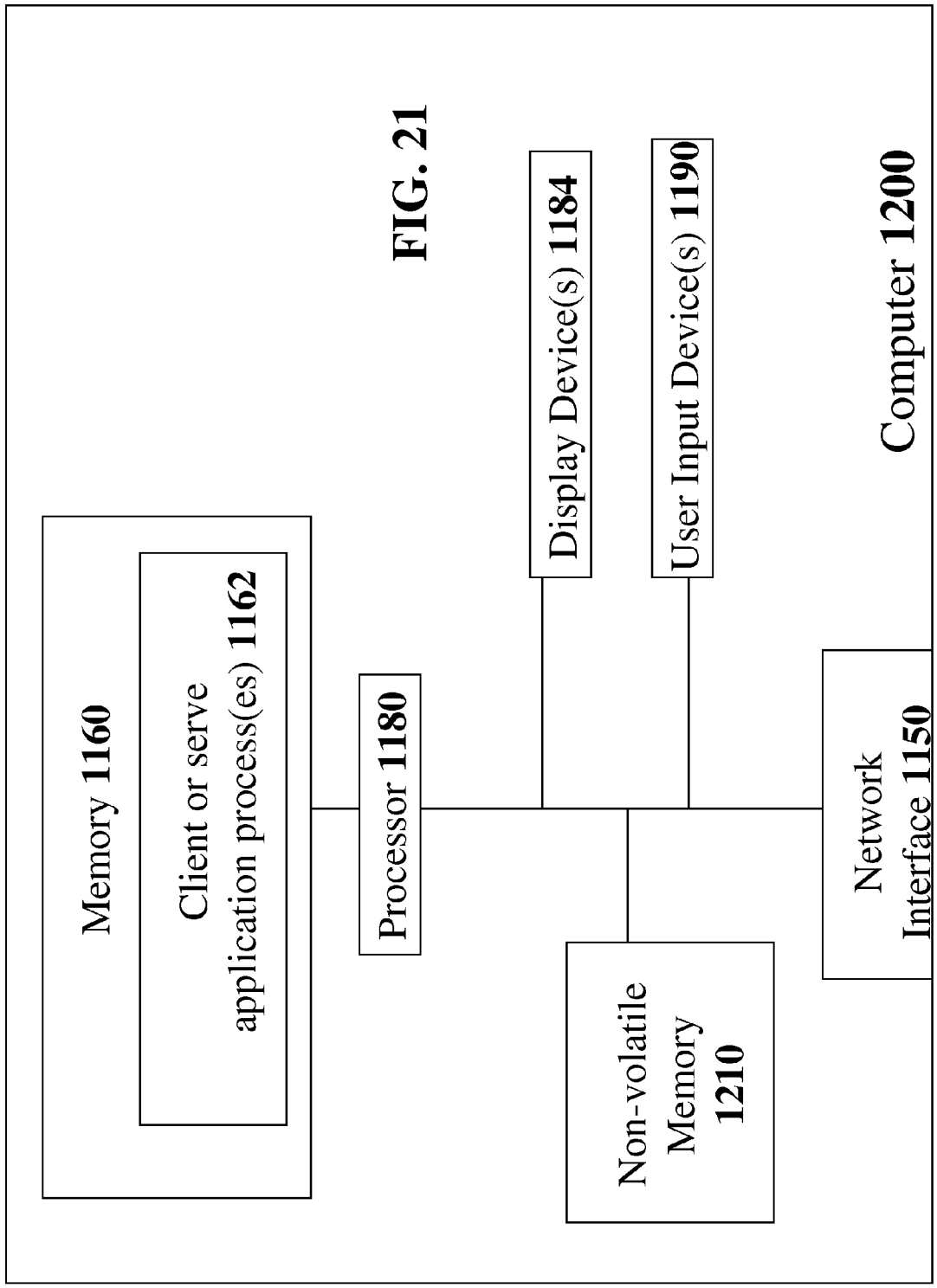
FIG. 21 illustrate a computer in some embodiments.

FIG. 21 illustrates one embodiment of a digital computer 1200 including a processor 1120. Processor 1180 is shown coupled to a memory 1160, a non-volatile storage 1210 (for example, a flash memory or a hard disk), a video display device 1180, one or more user input device(s) 1190, and a network interface 1150 such as a network interface card. It is appreciated that not every element is required in every embodiment.

Processor 1180 may be configured to execute instructions and to process data according to a particular instruction set architecture (ISA). In one embodiment, processor 1180 may be configured to implement an x86 compatible ISA, although in other embodiments it is contemplated that any desired ISA may be employed, such as the SPARC V9 ISA, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.).

In various embodiments, memory 1160 may comprise any suitable type of system memory as described above, such as FB-DIMM, DDR/DDR2 SDRAM, or RDRAM, for example or any other types of volatile memory. Memory 1160 may include multiple discrete banks of memory. Also, in some embodiments memory 1160 may include multiple different types of memory. Memory 1160 may also include non-volatile memory such as magnetic memory (e.g. a hard disk, flash memory, etc).

In some embodiments, computer 1200 may include more than one instance of the devices shown, such as more than one processor 1180, for example. In various embodiments, computer 1200 may be configured as a rack-mountable server system, a standalone system, or in any other suitable form factor. In different embodiments, computer 1200 may be configured as a client system or as a server system.

In one embodiment, processor 1180 may be configured to run operating system software such as Microsoft Windows, IBM AIX or Sun Microsystems Solaris. Operating system software may in turn provide an environment in which processor 1180 may execute additional software modules in the form of applications, programs, or processes designed to perform specific functions. Running operating system software or software modules may comprise executing instructions that are stored in memory 1160. As shown in FIG. 21, a client or server application process 1162 may reside in the memory 1160.

Software modules that may be executed by processor 1180 may include, in one embodiment, client/server software such as a web server or a web browser. Alternatively, or in addition, processor 1180 may execute software modules comprising network management software, office productivity tools, e-mail programs, etc.

In a networked deployment, the computer system may operate in the capacity of a server or as a client user computer in a server-client user network environment, or as a peer computer system in a peer-to-peer (or distributed) network environment. The computer system can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system can be implemented using electronic devices that provide voice, video or data communication. Further, while a single computer system is illustrated, the term "system" shall also be taken to include any collection of systems or sub-systems that individually or jointly execute a set, or multiple sets, of instructions to perform one or more computer functions.

As shown, the computer system may further include and/or be operatively linked to a display device 1180, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory or in the drive unit The memory and the processor also may include computer-readable media as discussed above.

The present disclosure contemplates a computer-readable medium that includes instructions or receives and executes instructions responsive to a propagated signal, so that a device connected to a network can communicate voice, video, audio, images or any other data over the network. Further, the instructions may be transmitted or received over the network via a communication port. The communication port may be a part of the processor or may be a separate component. The communication may be created in software or may be a physical connection in hardware. The communication port is configured to connect with a network, external media, the display, or any other components in system, or combinations thereof. The connection with the network may be a physical connection, such as a wired Ethernet connection or may be established wirelessly as discussed below Likewise, the additional connections with other components of the system may be physical connections or may be established wirelessly.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

It is further noted that any of the embodiments described above may further include receiving, sending or storing instructions and/or data that implement the operations described above in conjunction with the figures upon a computer readable medium. Generally speaking, a computer readable medium may include storage media or memory media such as magnetic or flash or optical media, e.g. disk or CD-ROM, volatile or non-volatile media such as RAM, ROM, etc. as well as transmission media or signals such as electrical, electromagnetic or digital signals conveyed via a communication medium such as network and/or wireless links

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A method of transforming an input stratigraphic grid SGrid which represents a region including one or more geological discontinuities, the method comprising:
    for at least one target cell that is local to one or more geological discontinuities, the to target cell being selected from the group consisting of:
        i) a divided cell that is divided by one or more of the geological-discontinuities; and
        ii) a bordering cell that borders one or more the geological-discontinuities and/or one or more of the divided cells,
    transforming the target cell by displacing at least one target vertex of the target cell of the input SGrid in a selected direction that:
        i) is selected to approximate a local tangent of the reference horizon; and
        ii) is oriented from the target vertex to a representative manifold representing one of the geological discontinuities and/or an intersection between two or more of the geological discontinuities,
    wherein a magnitude of a displacement by which the target vertex is moved is determined according to a non Euclidian distance between the target vertex of the target cell of the input SGrid and the representative manifold.

2. The method of claim 1 wherein the method further comprises:
    classifying cells of the input stratigraphic grid to identify which cells are geological-discontinuity-local cells that are local to the one or more geological discontinuities,
    wherein the transforming of the input stratigraphic grid vertex is carried out selectively or preferentially to target cells that are identified as geological-discontinuity-local cells.

3. The method of claim 2 wherein the target cells are cells that are local to one of:
    i) an inter-region geological discontinuity describing a border between multiple sub-regions of the Earth's sub-surface; and
    ii) a dying fault that resides within a single sub-region of the Earth's sub-surface.

4. The method of claim 2 wherein the method further comprises the step of:
    classifying vertices of the geological-discontinuity-local cells to determine which vertices are border vertices of a border between multiple sub-regions of the Earth's sub-surface that approximates one or more of the geological discontinuities;
    wherein the transforming of the input stratigraphic grid vertex is carried out selectively or preferentially to target vertices that are identified as border vertices.

5. The method of claim 4 wherein the transforming of the input stratigraphic grid vertex is carried out selectively or preferentially to target vertices that are identified as stair-stepped-border vertices that are part of a stair-stepped approximation of one or more of the geological discontinuities.

6. The method of claim 1 wherein cell transforming is selectively carried out respectively for each cell of a stair-step set of cells which collectively provide a stair-step approximation of a geological continuity, thereby smoothing a stair-step approximation of the geological discontinuity.

7. The method of claim 1 wherein:
   i) the method further comprises the step of determining a number of local geological discontinuities that are local to the target vertex or target vertex;
   ii) the representative manifold is indicative of the determined number of local geological discontinuities; and
   iii) the magnitude of the displacement by which the target vertex is moved and the selected direction are determined according to the number of local geological discontinuities.

8. The method of claim 1 wherein the cell transforming is carried out so as to preserve the number of sides and the number of vertices of the geological-discontinuity-facing facet.

9. The method of claim 8 wherein the cell transforming is carried out so that, from a topological perspective, lateral facets of
   i) input cells of the input SGrid and;
   ii) cells of the transformed grid
both have a topologically quadrilateral shape.

10. The method of claim 1 wherein the cell transforming is carried out to a transform a target cell that is intersected by a geological discontinuity into a transformed cell that is not intersected by a geological discontinuity.

11. The method of claim 1 wherein the input SGrid is a contradictory SGrid comprising overlapping cells and the method is carried out to resolve the self-contradiction and transform overlapping cells so that they no longer overlap.

12. The method of claim 1 wherein the transforming effects at least one of:
   i) increasing or decreasing a size of the target cell by at least 50%; and
   ii) increasing or decreasing an area of a facet of the target cell by at least 50%.

13. The method of claim 1 wherein the transforming of the target cell modifies an angle between two facets of the target cell from (i) substantially a right angle having a value of between 75 and 105 degrees to (ii) substantially a sharp angle having a value that is less than 45 degrees or greater than 135 degrees.

14. The method of claim 1 wherein the non-Euclidian distance metric is a biased distance metric which, relative to a three-dimensional Euclidian distance metric:
   i) emphasizes distances within a emphasized-plane that is the tangent plane of the reference horizon and/or the plane of the upper or lower facet;
   ii) deemphasizes distances normal to the emphasized plane.

15. The method of claim 1 wherein: a magnitude of a displacement by which the target vertex is moved exceeds the closest Euclidian distance between the target vertex and the representative manifold by at least 5%.

16. The method of claim 1 wherein an angle between the local tangent of the reference horizon and a local tangent of the representative manifold is less than 85 degrees.

17. The method of claim 1 wherein the magnitude of the displacement by which the target vertex is moved is determined according to a non-Euclidian distance between the target vertex of the target cell of the input SGrid and the representative manifold.

18. The method of claim 17 wherein before the transforming, first and second portions of the target cell are disposed on opposite side of one of the geological disctiunities, and the transforming shrinks the target cell by eliminating therefrom the first portion of the target cell while retaining, within the target cell, the second portion thereof.

19. The method of claim 1 wherein the method further comprises:
   contingent upon the cell transforming reducing the volume of the target cell by at least a minimum amount, merging the volume-reduced transformed target cell with an adjacent cell that is adjacent to the volume-reduced transformed target cell.

20. The method of claim 1 wherein the transforming effects at least one of:
   i) increasing or decreasing a size of the target cell by at least 30%; and
   ii) increasing or decreasing an area of a facet of the target cell by at least 30%.

21. The method of claim 1 wherein cell transforming is selectively carried out respectively for each cell of a stair-step set of cells which collectively provide a stair-step approximation of a geological continuity.

22. A system for transforming an input stratigraphic grid SGrid which represents a region including one or more geological discontinuities, the system comprising:
   a) memory configured to store the input SGrid; and
   b) a computer processer configured to transform the input SGrid, the computer processor configured, for at least one target cell that is local to one or more geological discontinuities, the target cell being selected from the group consisting of:
      i) a divided cell that is divided by one or more of the geological-discontinuities; and
      ii) a bordering cell that borders one or more the geological-discontinuities and/or one or more of the divided cells,
   to transform the target cell by displacing at least one target vertex of the target cell of the input SGrid in a selected direction that:
      i) is selected to approximate a local tangent of the reference horizon; and
      ii) is oriented from the target vertex to a representative manifold representing one of the geological discontinuities and/or an intersection between two or more of the geological discontinuities,
   wherein a magnitude of a displacement by which the target vertex is moved is determined according to a distance between the target vertex of the target cell of the input SGrid and the representative manifold.

23. A method of transforming an input stratigraphic grid SGrid which represents a region including one or more geological discontinuities, the method comprising:
   for at least one divided target cell that (i) is divided by one or more of the geological discontinuities and (ii) belongs to the input SGrid, transforming the divided target cell by displacing at least one target vertex thereof in a selected direction that:
      A) is selected to approximate a local tangent of the reference horizon; and
      B) is oriented from the target vertex to a representative manifold representing one of the geological discontinuities and/or an intersection between two or more of the geological discontinuities,
   wherein a magnitude of a displacement by which the target vertex is moved is determined according to a distance between the target vertex of the target cell of the input S Grid and the representative manifold.

* * * * *